United States Patent
DeStefano et al.

(10) Patent No.: US 6,435,812 B1
(45) Date of Patent: Aug. 20, 2002

(54) BORE TUBE ASSEMBLY FOR STEAM COOLING A TURBINE ROTOR

(75) Inventors: Thomas Daniel DeStefano, Ballston Lake; Ian David Wilson, Clifton Park, both of NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/566,726

(22) Filed: May 9, 2000

Related U.S. Application Data

(63) Continuation of application No. 09/216,363, filed on Dec. 18, 1998.

(51) Int. Cl.[7] .................................................. F01D 5/14
(52) U.S. Cl. ..................................... 415/115; 416/97 R
(58) Field of Search ..................... 415/11, 116; 416/98, 416/96 R, 96 A, 97 R

(56) References Cited

U.S. PATENT DOCUMENTS

| | | | |
|---|---|---|---|
| 5,144,794 A | * 9/1992 | Kirikami et al. | ............. 415/115 |
| 5,593,274 A | 1/1997 | Carreno et al. | |
| 5,738,488 A | * 4/1998 | Gazzillo et al. | ............. 415/111 |
| 5,795,130 A | * 8/1998 | Suenaga et al. | ........... 416/96 R |
| 6,155,040 A | * 12/2000 | Sasaki | .......................... 416/95 |
| 6,224,327 B1 | * 5/2001 | Aoki et al. | ..................... 416/95 |

OTHER PUBLICATIONS

"39th GE Turbine State–of–the–Art Technology Seminar", Tab 1, ""F" Technology—the First Half–Million Operating Hours", H.E. Miller, Aug. 1996.
"39th GE Turbine State–of–the–Art Technology Seminar", Tab 2, "GE Heavy–Duty Gas Turbine Performance Characteristics", F. J. Brooks, Aug. 1996.
"39th GE Turbine State–of–the–Art Technology Seminar", Tab 3, "9EC 50Hz 170–MW Class Gas Turbine", A. S. Arrao, Aug. 1996.
"39th GE Turbine State–of–the–Art Technology Seminar", Tab 4, "MWS6001FA—An Advanced–Technology 70–MW Class 50/60 Hz Gas Turbine", Ramachandran et al., Aug. 1996.
"39th GE Turbine State–of–the–Art Technology Seminar", Tab 5, "Turbomachinery Technology Advances at Nuovo Pignone", Benvenuti et al., Aug. 1996.
"39th GE Turbine State–of–the–Art Technology Seminar", Tab 6, "GE Aeroderivative Gas Turbines—Design and Operating Features", M.W. Horner, Aug. 1996.
"39th GE Turbine State–of–the–Art Technology Seminar", Tab 7, "Advance Gas Turbine Materials and Coatings", P.W. Schilke, Aug. 1996.

(List continued on next page.)

*Primary Examiner*—Edward K. Look
*Assistant Examiner*—James M McAleenan
(74) *Attorney, Agent, or Firm*—Nixon & Vanderhye

(57) ABSTRACT

An axial bore tube assembly for a turbine is provided to supply cooling steam to hot gas components of the turbine wheels and return the spent cooling steam. A pair of inner and outer tubes define a steam supply passage concentric about an inner return passage. The forward ends of the tubes communicate with an end cap assembly having sets of peripheral holes communicating with first and second sets of radial tubes whereby cooling steam from the concentric passage is supplied through the end cap holes to radial tubes for cooling the buckets and return steam from the buckets is provided through the second set of radial tubes through a second set of openings of the end cap into the coaxial return passage. A radial-to-axial flow transitioning device, including anti-swirling vanes is provided in the end cap. A strut ring adjacent the aft end of the bore tube assembly permits axial and radial thermal expansion of the inner tube relative to the outer tube.

19 Claims, 12 Drawing Sheets

OTHER PUBLICATIONS

"39th GE Turbine State–of–the–Art Technology Seminar", Tab 8, "Dry Low NO$_X$ Combustion Systems for GE Heavy–Duty Turbines", L. B. Davis, Aug. 1996.

"39th GE Turbine State–of–the–Art Technology Seminar", Tab 9, "GE Gas Turbine Combustion Flexibility", M. A. Davi, Aug. 1996.

"39th GE Turbine State–of–the–Art Technology Seminar", Tab 10, "Gas Fuel Clean–Up System Design Considerations for GE Heavy–Duty Gas Turbines", C. Wilkes, Aug. 1996.

"39th GE Turbine State–of–the–Art Technology Seminar", Tab 11, "Integrated Control Systems for Advanced Combined Cycles", Chu et al., Aug. 1996.

"39th GE Turbine State–of–the–Art Technology Seminar", Tab 12, "Power Systems for the 21st Century "H" Gas Turbine Combined Cycles", Paul et al., Aug. 1996.

"39th GE Turbine State–of–the–Art Technology Seminar", Tab 13, "Clean Coal and Heavy Oil Technologies for Gas Turbines", D. M. Todd, Aug. 1996.

"39th GE Turbine State–of–the–Art Technology Seminar", Tab 14, "Gas Turbine Conversions, Modifications and Uprates Technology", Stuck et al., Aug. 1996.

"39th GE Turbine State–of–the–Art Technology Seminar", Tab 15, "Performance and Reliability Improvements for Heavy–Duty Gas Turbines, "J. R. Johnston, Aug. 1996.

"39th GE Turbine State–of–the–Art Technology Seminar", Tab 16, "Gas Turbine Repair Technology", Crimi et al, Aug. 1996.

"39th GE Turbine State–of–the–Art Technology Seminar", Tab 17, "Heavy Duty Turbine Operating & Maintenance Considerations", R. F. Hoeft, Aug. 1996.

"39th GE Turbine State–of–the–Art Technology Seminar", Tab 18, "Gas Turbine Performance Monitoring and Testing", Schmitt et al., Aug. 1996.

"39th GE Turbine State–of–the–Art Technology Seminar", Tab 19, "Monitoring Service Delivery System and Diagnostics", Madej et al., Aug. 1996.

"39th GE Turbine State–of–the–Art Technology Seminar", Tab 20, "Steam Turbines for Large Power Applications", Reinker et al., Aug. 1996.

"39th GE Turbine State–of–the–Art Technology Seminar", Tab 21, "Steam Turbines for Ultrasupercritical Power Plants", Retzlaff et al., Aug. 1996.

"39th GE Turbine State–of–the–Art Technology Seminar", Tab 22, "Steam Turbine Sustained Efficiency", P. Schofield, Aug. 1996.

"39th GE Turbine State–of–the–Art Technology Seminar", Tab 23, "Recent Advances in Steam Turbines for Industrial and Cogeneration Applications", Leger et al., Aug. 1996.

"39th GE Turbine State–of–the–Art Technology Seminar", Tab 24, "Mechanical Drive Steam Turbines", D. R. Leger, Aug. 1996.

"39th GE Turbine State–of–the–Art Technology Seminar", Tab 25, "Steam Turbines for STAG™ Combined–Cycle Power Systems", M. Boss, Aug, 1996.

"39th GE Turbine State–of–the–Art Technology Seminar", Tab 26, "Cogeneration Application Considerations", Fisk et al., Aug. 1996.

"39th GE Turbine State–of–the–Art Technology Seminar", Tab 27, "Performance and Economic Considerations of Repowering Steam Power Plants", Stoll et al., Aug. 1996.

"39th GE Turbine State–of–the–Art Technology Seminar", Tab 28, "High–Power–Density™ Steam Turbine Design Evolution", J. H. Moore, Aug.1996.

"39th GE Turbine State–of–the–Art Technology Seminar", Tab 29, "Advances in Steam Path Technologies", Cofer, IV, et al., Aug. 1996.

"39th GE Turbine State–of–the–Art Technology Seminar", Tab 30, "Upgradable Opportunities for Steam Turbines", D. R. Dreier, Jr., Aug. 1996.

"39th GE Turbine State–of–the–Art Technology Seminar", Tab 31, "Uprate Options for Industrial Turbines", R. C. Beck, Aug. 1996.

"39th GE Turbine State–of–the–Art Technology Seminar", Tab 32, "Thermal Performance Evaluation and Assessment of Steam Turbine Units", P. Albert, Aug. 1996.

"39th GE Turbine State–of–the–Art Technology Seminar", Tab 33, "Advances in Welding Repair Technology" J. F. Nolan, Aug. 1996.

"39th GE Turbine State–of–the–Art Technology Seminar", Tab 34, "Operation and Maintenance Strategies to Enhance Plant Profitability", MacGillivray et al., Aug. 1996.

"39th GE Turbine State–of–the–Art Technology Seminar", Tab 35, "Generator Insitu Inspections", D. Stanton.

"39th GE Turbine State–of–the–Art Technology Seminar", Tab 36, "Generator Upgrade and Rewind", Halpern et al., Aug. 1996.

"39th GE Turbine State–of–the–Art Technology Seminar", Tab 37, "GE Combined Cycle Product Line and Performance", Chase, et al., Aug. 1996.

"39th GE Turbine State–of–the–Art Technology Seminar", Tab 38, "GE Combined Cycle Experience", Maslak et al., Aug. 1996.

"39th GE Turbine State–of–the–Art Technology Seminar", Tab 39, "Single–Shaft Combined Cycle Power Generation Systems", Tomlinson et al., Aug. 1996.

"Advanced Turbine System Program—Conceptual Design and Product Development", Annual Report, Sep. 1, 1994–Aug. 31, 1995.

"Advanced Turbine Systems (ATS Program) Conceptual Design and Product Development", Final Technical Progress Report, vol. 2—Industrial Machine, Mar. 31, 1997, Morgantown, WV.

"Advanced Turbine System Programs Conceptual Design and Product Development", Final Technical Progress Report, Aug. 31, 1996, Morgantown, WV.

"Advanced Turbine Systems (ATS) Program, Phase 2, Conceptual Design and Product Development", Yearly Technical Progress Report, Reporting Period: Aug. 25, 1993–Aug. 31, 1994.

"Advanced Turbine Systems" Annual Program Review, Preprints, Nov. 2–4, 1998, Washington, D.C. U.S. Department of Energy, Office of Industrial Technologies Federal Energy Technology Center.

"ATS Conference" Oct. 28, 1999, Slide Presentation.

"Baglan Bay Launch Site", various articles relating to Baglan Energy Park.

"Baglan Energy Park", Brochure.

"Commercialization", Del Williamson, Present, Global Sales, May 8, 1998.

"Environmental, Health and Safety Assessment: ATS 7H Program (Phase 3R) Test Activities at the GE Power Systems Gas Turbine Manufacturing Facility, Greenville, SC", Document #1753, Feb. 1998, Publication Date: Nov. 17, 1998, Report Nos. DE–FC21–95MC31176—11.

"Exhibit panels used at 1995 product introduction at PowerGen Europe".

"Extensive Testing Program Validates High Efficiency, reliability of GE's Advanced "H" Gas Turbine Technology", Press Information, Press Release, 96–NR14, Jun. 26, 1996, H Technology Tests/pp. 1–4.

"Extensive Testing Program Validates High Efficiency, Reliability of GE's Advanced "H" Gas Turbine Technology", GE Introduces Advanced Gas Turbine Technology Platform: First to Reach 60% Combined–Cycle Power Plant Efficiency, Press Information, Press Release, Power–Gen Europe '95, 95–NRR15, Advanced Technology Introduction/pp. 1–6.

"Gas, Steam Turbine Work as Single Unit in GE's Advanced H Technology Combined–Cycle System", Press Information, Press Release, 95–NR18, May 16, 1995, Advanced Technology Introduction/pp. 1–3.

"GE Breaks 60% Net Efficiency Barrier" paper, 4 pages.

"GE Businesses Share Technologies and Experts to Develop State–Of–The–Art Products", Press Information, Press Release 95–NR10, May 16, 1995, GE Technology Transfer/pp. 1–3.

"General Electric ATS Program Technical Review, Phase 2 Activities", T. Chance et al., pp. 1–4.

"General Electric's DOE/ATS H Gas Turbine Development" Advanced Turbine Systems Annual Review Meeting, Nov. 7–8, 1996, Washington, D.C., Publication Release.

"H Technology Commercialization", 1998 MarComm Activity Recommendation, Mar., 1998.

"H Technology", Jon Ebacher, VP, Power Gen Technology, May 8, 1998.

"H Testing Process", Jon Ebacher, VP, Power Gen Technology, May 8, 1998.

"Heavy–Duty & Aeroderivative Products" Gas Turbines, Brochure, 1998.

"MS7001H/MS9001H Gas Turbine, gepower.com website for PowerGen Europe" Jun. 1–3 going public Jun. 15, (1995).

"New Steam Cooling System is a Key to 60% Efficiency For GE "H" Technology Combined–Cycle Systems", Press Information, Press Release, 95–NRR16, May 16, 1995, H Technology/pp. 1–3.

"Overview of GE's H Gas Turbine Combined Cycle", Jul. 1, 1995 to Dec. 31, 1997.

"Power Systems for the 21$^{st}$ Century—"H" Gas Turbine Combined Cycles", Thomas C. Paul et al., Report.

"Power–Gen '96 Europe", Conference Programme, Budapest, Hungary, Jun. 26–28, 1996.

"Power–Gen International", 1998 Show Guide, Dec. 9–11, 1998, Orange County Convention Center, Orlando, Florida.

"Press Coverage following 1995 product announcement"; various newspaper clippings relating to improved generator.

"Proceedings of the Advanced Turbine Systems Annual Program Review Meeting", vol. I, "Industrial Advanced Turbine Systems Program Overview", D.W. Esbeck, pp. 3–13, Oct., 1995.

"Proceedings of the Advanced Turbine Systems Annual Program Review Meeting", vol. I, "H Gas Turbine Combined Cycle", J. Corman, pp. 14–21, Oct., 1995.

"Proceedings of the Advanced Turbine Systems Annual Program Review Meeting", vol. I, "Overview of Westinghouse's Advanced Turbine Systems Program", Bannister et al., pp. 22–30, Oct., 1995.

"Proceedings of the Advanced Turbine Systems Annual Program Review Meeting", vol. I, "Allison Engine ATS Program Technical Review", D. Mukavetz, pp. 31–42, Oct., 1995.

"Proceedings of the Advanced Turbine Systems Annual Program Review Meeting", vol. I, "Advanced Turbine Systems Program Industrial System Concept Development", S. Gates, pp. 43–63, Oct., 1995.

"Proceedings of the Advanced Turbine Systems Annual Program Review Meeting", vol. I, "Advanced Turbine System Program Phase 2 Cycle Selection", Latcovich, Jr., pp. 64–69, Oct., 1995.

"Proceedings of the Advanced Turbine Systems Annual Program Review Meeting", vol. I, "General Electric ATS Program Technical Review Phase 2 Activities", Chance et al., pp. 70–74, Oct., 1995.

"Proceedings of the Advanced Turbine Systems Annual Program Review Meeting", vol. I, "Technical Review of Westinghouse's Advanced Turbine Sytems Program", Diakunchak et al., pp. 75–86, Oct., 1995.

"Proceedings of the Advanced Turbine Systems Annual Program Review Meeting", vol. I, "Advanced Combustion Turbines and Cycles: An EPRI Perspective", Touchton et al., pp. 87–88, Oct., 1995.

"Proceedings of the Advanced Turbine Systems Annual Program Review Meeting", vol. I, "Advanced Turbine Systems Annual Program Review", William E. Koop, pp. 89–92, Oct., 1995.

"Proceedings of the Advanced Turbine Systems Annual Program Review Meeting", vol. I, "The AGTSR Consortium: An Update", Fant et al., pp. 93–102, Oct., 1995.

"Proceedings of the Advanced Turbine Systems Annual Program Review Meeting", vol. I, "Overview of Allison/AGTSR Interactions", Sy A. Ali, pp. 103–106, Oct., 1995.

"Proceedings of the Advanced Turbine Systems Annual Program Review Meeting", vol. I, "Design Factors for Stable Lean Premix Combustion", Richards et al., pp. 107–113, Oct., 1995.

"Proceedings of the Advanced Turbine Systems Annual Program Review Meeting", vol. I, "Ceramic Stationary as Turbine", M. van Roode, pp. 114–147, Oct., 1995.

"Proceedings of the Advanced Turbine Systems Annual Program Review Meeting", vol. I, "DOE/Allison Ceramic Vane Effort", Wenglarz et al., pp. 148–151, Oct., 1995.

"Proceedings of the Advanced Turbine Systems Annual Program Review Meeting", vol. I, "Materials/Manufacturing Element of the Advanced Turbine Systems Program", Karnitz et al., pp. 152–160, Oct., 1995.

"Proceedings of the Advanced Turbine Systems Annual Program Review Meeting", vol. I, "Land–Based Turbine Casting Initiative", Mueller et al., pp. 161–170, Oct., 1995.

"Proceedings of the Advanced Turbine Systems Annual Program Review Meeting", vol. I, "Turbine Airfoil Manufacturing Technology", Kortovich, pp. 171–181, Oct., 1995.

"Proceedings of the Advanced Turbine Systems Annual Program Review Meeting", vol. I, "Pratt & Whitney Thermal Barrier Coatings", Bornstein et al., pp. 182–183, Oct., 1995.

"Proceedings of the Advanced Turbine Systems Annual Program Review Meeting", vol. I, "Westinhouse Thermal Barrier Coatings", Goedjen et al., pp. 194–199, Oct., 1995.

"Proceedings of the Advanced Turbine Systems Annual Program Review Meeting", vol. I, "High Performance Steam Development", Duffy et al., pp. 220–220, Oct., 1995.

"Proceedings of the Advanced Turbine Systems Annual Program Review Meeting", vol. II, "Lean Premixed Combustion Stabilized by Radiation Feedback and heterogeneous Catalysis", Dibble et al., pp. 221–232, Oct., 1995.

"Proceedings of the Advanced Turbine Systems Annual Program Review Meeting", vol. II, Rayleigh/Raman/LIF Measurements in a Turbulent Lean Premixed Combustor, Nandula et al. pp. 233–248, Oct., 1995.

"Proceedings of the Advanced Turbine Systems Annual Program Review Meeting", vol. II, "Lean Premixed Flames for Low $No_X$ Combustors", Sojka et al., pp. 249–275, Oct., 1995.

"Proceedings of the Advanced Turbine Systems Annual Program Review Meeting", vol. II, "Functionally Gradient Materials for Thermal Barrier Coatings in Advanced Gas Turbine Systems", Banovic et al., p. 276–280, Oct., 1995.

"Proceedings of the Advanced Turbine Systems Annual Program Review Meeting", vol. II, "Advanced Turbine Cooling, Heat Transfer, and Aerodynamic Studies", Han et al., pp. 281–309, Oct., 1995.

"Proceedings of the Advanced Turbine Systems Annual Program Review Meeting", vol. II, "Life Prediction of Advanced Materials for Gas Turbine Application", Zamrik et al., pp. 310–327, Oct., 1995.

"Proceedings of the Advanced Turbine Systems Annual Program Review Meeting", vol. II, "Advanced Combustion Technologies for Gas Turbine Power Plants", Vandsburger et al., pp. 328–352, Oct., 1995.

"Proceedings of the Advanced Turbine Systems Annual Program Review Meeting", vol. II, "Combustion Modeling in Advanced Gas Turbine Systems", Smoot et al., pp. 353–370, Oct., 1995.

"Proceedings of the Advanced Turbine Systems Annual Program Review Meeting", vol. II, "Heat Transfer in a Two-Pass Internally Ribbed Turbine Blade Coolant Channel with Cylindrical Vortex Generators", Hibbs et al., pp. 371–390, Oct., 1995.

"Proceedings of the Advanced Turbine Systems Annual Program Review Meeting", vol. II, "Rotational Effects on Turbine Blade Cooling", Govatzidakia et al., pp. 391–392, Oct., 1995.

"Proceedings of the Advanced Turbine Systems Annual Program Review Meeting", vol. II, "Manifold Methods for Methane Combustion", Yang et al., pp. 393–409, Oct., 1995.

"Proceedings of the Advanced Turbine Systems Annual Program Review Meeting, vol. II", "Advanced Multistage Turbine Blade Aerodynamics, Performance, Cooling, and Heat Transfer", Fleeter et al., pp. 410–414, Oct., 1995.

"Proceedings of the Advanced Turbine Systems Annual Program Review Meeting", vol. II, The Role of Reactant Unmixedness, Strain Rate, and Length Scale on Premixed Combustor Performance, Samuelsen et al., pp. 415–422, Oct., 1995.

"Proceedings of the Advanced Turbine Systems Annual Program Review Meeting", vol. II, "Experimental and Computational Studies of Film Cooling With Compound Angle Injection", Goldstein et al., pp. 423–451, Oct., 1995.

"Proceedings of the Advanced Turbine Systems Annual Program Review Meeting", vol. II, "Compatibility of Gas Turbine Materials with Steam Cooling", Desai et al., pp. 352–464, Oct., 1995.

"Proceedings of the Advanced Turbine Systems Annual Program Review Meeting", vol. II, "Use of a Laser–Induced Fluorescence Thermal Imaging System for Film Cooling Heat Transfer Measurement", M. K. Chyu, pp. 465–473, Oct., 1995.

"Proceedings of the Advanced Turbine Systems Annual Program Review Meeting", vol. II, Effects of Geometry of Slot–Jet Film Cooling Performance, Hyams et al., pp. 474–496 Oct., 1995.

"Proceedings of the Advanced Turbine Systems Annual Program Review Meeting", vol. II, "Steam as Turbine Blade Coolant: Experimental Data Generation", Wilmsen et al., pp. 497–505, Oct., 1995.

"Proceedings of the Advanced Turbine Systems Annual Program Review Meeting", vol. II, "Combustion Chemical Vapor Deposited Coatings for Thermal Barrier Coating Systems", Hampikian et al., pp. 506–515, Oct., 1995.

"Proceedings of the Advanced Turbine Systems Annual Program Review Meeting", vol. II, "Premixed Burner Experiments: Geometry, Mixing, and Flame Structure Issues", Gupta et al., pp. 516–528, Oct., 1995.

"Proceedings of the Advanced Turbine Systems Annual Program Review Meeting", vol. II, "Intercooler Flow Path for Gas Turbines: CFD Design and Experiments", Agrawal et al., pp. 529–538, Oct., 1995.

"Proceedings of the Advanced Turbine Systems Annual Program Review Meeting", vol. II, "Bond Strength and Stress Measurements in Thermal Barrier Coatings", Gell et al., pp. 539–549, Oct., 1995.

"Proceedings of the Advanced Turbine Systems Annual Program Review Meeting", vol. II, "Active Control of Combustion Instabilities in Low $NO_X$ Gas Turbines", Zinn et al., pp. 550–551, Oct., 1995.

"Proceedings of the Advanced Turbine Systems Annual Program Review Meeting", vol. II, "Combustion Instability Modeling and Analysis", Santoro et al., pp. 552–559, Oct., 1995.

"Proceedings of the Advanced Turbine Systems Annual Program Review Meeting", vol. II, "Flow and Heat Transfer in Gas Turbine Disk Cavities Subject to Nonuniform External Pressure Field", Roy et al., pp. 560–565, Oct., 1995.

"Proceedings of the Advanced Turbine Systems Annual Program Review Meeting", vol. II, "Heat Pipe Turbine Vane Cooling", Langston et al., pp. 566–572, Oct., 1995.

"Proceedings of the Advanced Turbine Systems Annual Program Review Meeting", vol. II, "Improved Modeling Techniques for Turbomachinery Flow Fields", Lakshminarayana et al., pp. 573–581, Oct., 1995.

"Proceedings of the Advanced Turbine Systems Annual Program Review Meeting", vol. II, "Advanced 3D Inverse Method for Designing Turbomachine Blades", T. Dang, p. 582, Oct., 1995.

"Proceedings of the Advanced Turbine Systems Annual Program Review Meeting", vol. II, "ATS and the Industries of the Future", Denise Swink, p. 1, Nov., 1996.

"Proceedings of the Advanced Turbine Systems Annual Program Review Meeting", vol. II, "Gas Turbine Association Agenda", William H. Day, pp. 3–16, Nov., 1996.

"Proceedings of the Advanced Turbine Systems Annual Program Review Meeting", vol. II, "Power Needs in the Chemical Industry", Keith Davidson, pp. 17–26, Nov., 1996.

"Proceedings of the Advanced Turbine Systems Annual Program Review Meeting", "Advanced Turbine Systems Program Overview", David Esbeck, pp. 27–34, Nov., 1996.

"Proceedings of the Advanced Turbine Systems Annual Program Review Meeting", "Westinghouse's Advanced Turbine Systems Program", Gerard McQuiggan, pp. 35–48, Nov., 1996.

"Proceedings of the Advanced Turbine Systems Annual Program Review Meeting", "Overview of GE's H Gas Turbine Combined Cycle", Cook et al., pp. 49–72, Nov., 1996.

"Proceedings of the Advanced Turbine Systems Annual Program Review Meeting", "Allison Advanced Simple Cycle Gas Turbine System", William D. Weisbrod, pp. 73–94, Nov., 1996.

"Proceedings of the Advanced Turbine Systems Annual Program Review Meeting", "The AGTSR Industry–University Consortium", Lawrence P. Golan, pp. 95–110, Nov., 1996.

"Proceedings of the Advanced Turbine Systems Annual Program Review Meeting", "$NO_X$ and CO Emissions Models for Gas–Fired Lean–Premixed Combustion Turbines", A. Mellor, pp. 111–122, Nov., 1996.

"Proceedings of the Advanced Turbine Systems Annual Program Review Meeting", "Methodologies for Active Mixing and Combustion Control", Uri Vandsburger, pp. 123–156, Nov., 1996.

"Proceedings of the Advanced Turbine Systems Annual Program Review Meeting", "Combustion Modeling in Advanced Gas Turbine Systems", Paul O. Hedman, pp. 157–180, Nov., 19967.

"Proceedings of the Advanced Turbine Systems Annual Program Review Meeting", "Manifold Methods for Methane Combustion", Stephen B. Pope, pp. 181–188, Nov., 1996.

"Proceedings of the Advanced Turbine Systems Annual Program Review Meeting", "The Role of Reactant Unmixedness, Strain Rate, and Length Scale on Premixed Combustor Performance", Scott Samuelsen, pp. 189–210, Nov., 1996.

"Proceedings of the Advanced Turbine Systems Annual Program Review Meeting", "Effect of Swirl and Momentum Distribution on Temperature Distribution in Premixed Flames", Ashwani K. Gupta, pp. 211–232, Nov., 1996.

"Proceedings of the Advanced Turbine Systems Annual Program Review Meeting", "Combustion Instability Studies Application to Land–Based Gas Turbine Combustors", Robert J. Santoro, p. 233–252.

"Proceedings of the Advanced Turbine Systems Annual Program Review Meeting", Active Control of Combustion Instabilities in Low $NO_X$ Turbines, Ben T. Zinn, pp. 253–264, Nov., 1996.

"Proceedings of the Advanced Turbine Systems Annual Program Review Meeting", "Life Prediction of Advanced Materials for Gas Turbine Application," Sam Y. Zamrik, pp. 265–274, Nov., 1996.

"Proceedings of the Advanced Turbine Systems Annual Program Review Meeting", "Combustion Chemical Vapor Deposited Coatings for Thermal Barrier Coating Systems", W. Brent Carter, pp. 275–290, Nov., 1996.

"Proceedings of the Advanced Turbine Systems Annual Program Review Meeting", "Compatibility of Gas Turbine Materials with Steam Cooling", Vimal Desai, pp. 291–314, Nov., 1996.

"Proceedings of the Advanced Turbine Systems Annual Program Review Meeting", "Bond Strength and Stress Measurements in Thermal Barrier Coatings", Maurice Gell, pp. 315–334, Nov., 1996.

"Proceedings of the Advanced Turbine Systems Annual Program Review Meeting", "Advanced Multistage Turbine Blade Aerodynamics, Performance, Cooling and Heat Transfer", Sanford Fleeter, pp. 335–356, Nov., 1996.

"Proceedings of the Advanced Turbine Systems Annual Program Review Meeting", "Flow Characteristics of an Intercooler System for Power Generating Gas Turbines", Ajay K. Agrawal, pp. 357–370, Nov., 1996.

"Proceedings of the Advanced Turbine Systems Annual Program Review Meeting", "Improved Modeling Techniques for Turbomachinery Flow Fields", B. Lakshiminarayana, pp. 371–392, Nov, 1996.

"Proceedings of the Advanced Turbine Systems Annual Program Review Meeting", "Development of an Advanced 3d & Viscous Aerodynamic Design Method for Turbomachine Components in Utility and Industrial Gas Turbine Applications", Thong Q. Dang, pp. 393–406, Nov., 1996.

"Proceedings of the Advanced Turbine Systems Annual Program Review Meeting", "Advanced Turbine Cooling, Heat Transfer, and Aerodynamic Studies", Je–Chin Han, pp. 407–426, Nov., 1996.

"Proceedings of the Advanced Turbine Systems Annual Program Review Meeting", "Heat Transfer in a Two–Pass Internally Ribbed Turbine Blade Coolant Channel with Vortex Generators", S. Acharya, pp. 427–446.

"Proceedings of the Advanced Turbine Systems Annual Program Review Meeting", "Experimental and Computational Studies of Film Cooling with Compound Angle Injection", R. Goldstein, pp. 447–460, Nov., 1996.

"Proceedings of the Advanced Turbine Systems Annual Program Review Meeting", "Study of Endwall Film Cooling with a Gap Leakage Using a Thermograhphic Phosphor Fluorescence Imaging System", Mingking K. Chyu, pp. 461–470, Nov., 1996.

"Proceedings of the Advanced Turbine Systems Annual Program Review Meeting", "Steam as a Turbine Blade Coolant: External Side Heat Transfer", Abraham Engeda, pp. 471–482, Nov., 1996.

"Proceedings of the Advanced Turbine Systems Annual Program Review Meeting", "Flow and Heat Transfer in Gas Turbine Disk Cavities Subject to Nonuniform External Pressure Field", Ramendra Roy, pp. 483–498, Nov., 1996.

"Proceedings of the Advanced Turbine Systems Annual Program Review Meeting", "Closed–Loop Mist/Steam Cooling for Advanced Turbine Systems", Ting Wang, pp. 499–512, Nov., 1996.

"Proceedings of the Advanced Turbine Systems Annual Program Review Meeting", "Heat Pipe Turbine Vane Cooling", Langston et al., pp. 513–534, Nov., 1996.

"Proceedings of the Advanced Turbine Systems Annual Program Review Meeting", "EPRI's Combustion Turbine Program: Status and Future Directions", Arthur Cohn, pp. 535,–552 Nov., 1996.

"Proceedings of the Advanced Turbine Systems Annual Program Review Meeting", "ATS Materials Support", Michael Karnitz, pp. 553–576, Nov., 1996.

"Proceedings of the Advanced Turbine Systems Annual Program Review Meeting", "Land Based Turbine Casting Initiative", Boyd A. Mueller, pp. 577–592, Nov., 1996.

"Proceedings of the Advanced Turbine Systems Annual Program Review Meeting", "Turbine Airfoil Manufacturing Technology", Charles S. Kortovich, pp. 593–622, Nov., 1996.

"Proceedings of the Advanced Turbine Systems Annual Program Review Meeting", "Hot Corrosion Testing of TBS's", Norman Bornstein, pp. 623–631, Nov., 1996.

"Proceedings of the Advanced Turbine Systems Annual Program Review Meeting", "Ceramic Stationary Gas Turbine", Mark van Roode, pp. 633–658, Nov., 1996.

"Proceedings of the Advanced Turbine Systems Annual Program Review Meeting", "Western European Status of Ceramics for Gas Turbines", Tibor Bornemisza, pp. 659–670, Nov., 1996.

"Proceedings of the Advanced Turbine Systems Annual Program Review Meeting", "Status of Ceramic Gas Turbines in Russia", Mark van Roode, p. 671, Nov., 1996.

"Status Report: The U.S. Department of Energy's Advanced Turbine systems Program", facsimile dated Nov. 7, 1996.

"Testing Program Results Validate GE's H Gas Turbine— High Efficiency, Low Cost of Electricity and Low Emissions", Roger Schonewald and Patrick Marolda, (no date available).

"Testing Program Results Validate GE's H Gas Turbine— High Efficiency, Low Cost of Electricity and Low Emissions", Slide Presentation—working draft, (no date available).

"The Next Step In H . . . For Low Cost Per kW–Hour Power Generation", LP–1 PGE '98.

"Utility Advanced Turbine System (ATS) Technology Readiness Testing and Pre–Commercialization Demonstration", Document #486040, Oct. 1–Dec. 31, 1996, Publication Date, Jun. 1, 1997, Report Nos: DOE/MC/31176–5628.

"Utility Advanced Turbine System (ATS) Technology Readiness Testing—Phase 3", Document #666274, Oct. 1, 1996–Sep. 30, 1997, Publication Date, Dec. 31, 1997, Report Nos: DOE/MC/31176–10.

"Utility Advanced Turbine System (ATS) Technology Readiness Testing and Pre–Commercial Demonstration, Phase 3", Document #486029, Oct. 1–Dec. 31, 1995, Publication Date, May 1, 1997, Report Nos: DOE/MC/31176–5340.

"Utility Advanced Turbine System (ATS) Technology Readiness Testing and Pre–Commercial Demonstration— Phase 3", Document #486132, Apr.1–Jun. 30, 1976, Publication Date, Dec. 31, 1996, Report Nos: DOE/MC/31176–5660.

"Utility Advanced Turbine System (ATS) Technology Readiness Testing and Pre–Commercial Demonstration— Phase 3", Document #587906, Jul. 1–Sep. 30, 1995, Publication Date, Dec. 31, 1995, Report Nos: DOE/MC/31176–5339.

"Utility Advanced Turbine System (ATS) Technology Readiness Testing and Pre–Commercial Demonstration" Document #666277, Apr. 1–Jun. 30, 1997, Publication Date, Dec. 31, 1997, Report Nos. DOE/MC/31176–8.

"Utility Advanced Turbine System (ATS) Technology Readiness Testing and Pre–Commercialization Demonstration" Jan. 1–Mar. 31, 1996, DOE/MC/31176–5338.

"Utility Advanced Turbine System (ATS) Technology Readiness Testing: Phase 3R", Document #756552, Apr. 1–Jun. 30, 1999, Publication Date, Sep. 1, 1999, Report Nos.: DE—FC21–95MC31176–23.

"Utility Advanced Turbine System (ATS) Technology Readiness Testing.", Document #656823, Jan. 1–Mar. 31, 1998, Publication Date, Aug. 1, 1998, Report Nos.: DOE/MC/31176–17.

"Utility Advanced Turbine Systems (ATS) Technology Readiness Testing and Pre–Commercial Demonstration", Annual Technical Progress Report, Reporting Period: Jul. 1, 1995–Sep. 30, 1996.

"Utility Advanced Turbine Systems (ATS) Technology Readiness Testing", Phase 3R, Annual Technical Progress Report, Reporting Period: Oct. 1, 1997–Sep. 30, 1998.

"Utility Advanced Turbine Systems (ATS) Technology Readiness Testing", Document #750405, Oct. 1–Dec. 30, 1998, Publication Date: May, 1, 1999, Report Nos.: DE–FC21–95MC31176–20.

"Utility Advanced Turbine Systems (ATS) Technology Readiness Testing", Document #1348, Apr. 1–Jun. 29, 1998, Publication Date Oct. 29, 1998, Report Nos DC–FC21–95MC31176—18.

"Utility Advanced Turbine Systems (ATS) Technology Readiness Testing—Phase 3", Annual Technical Progress Report, Reporting Period: Oct. 1, 1996–Sep. 30, 1997.

"Utility Advanced Turbine Systems (ATS) Technology Readiness Testing and Pre–Commercial Demonstration", Quarterly Report, Jan. 1–Mar. 31, 1997, Document #666275, Report Nos: DOE/MC/31176–07.

"Proceedings of the 1997 Advanced Turbine Systems", Annual Program Review Meeting, Oct. 28–29, 1997.

* cited by examiner

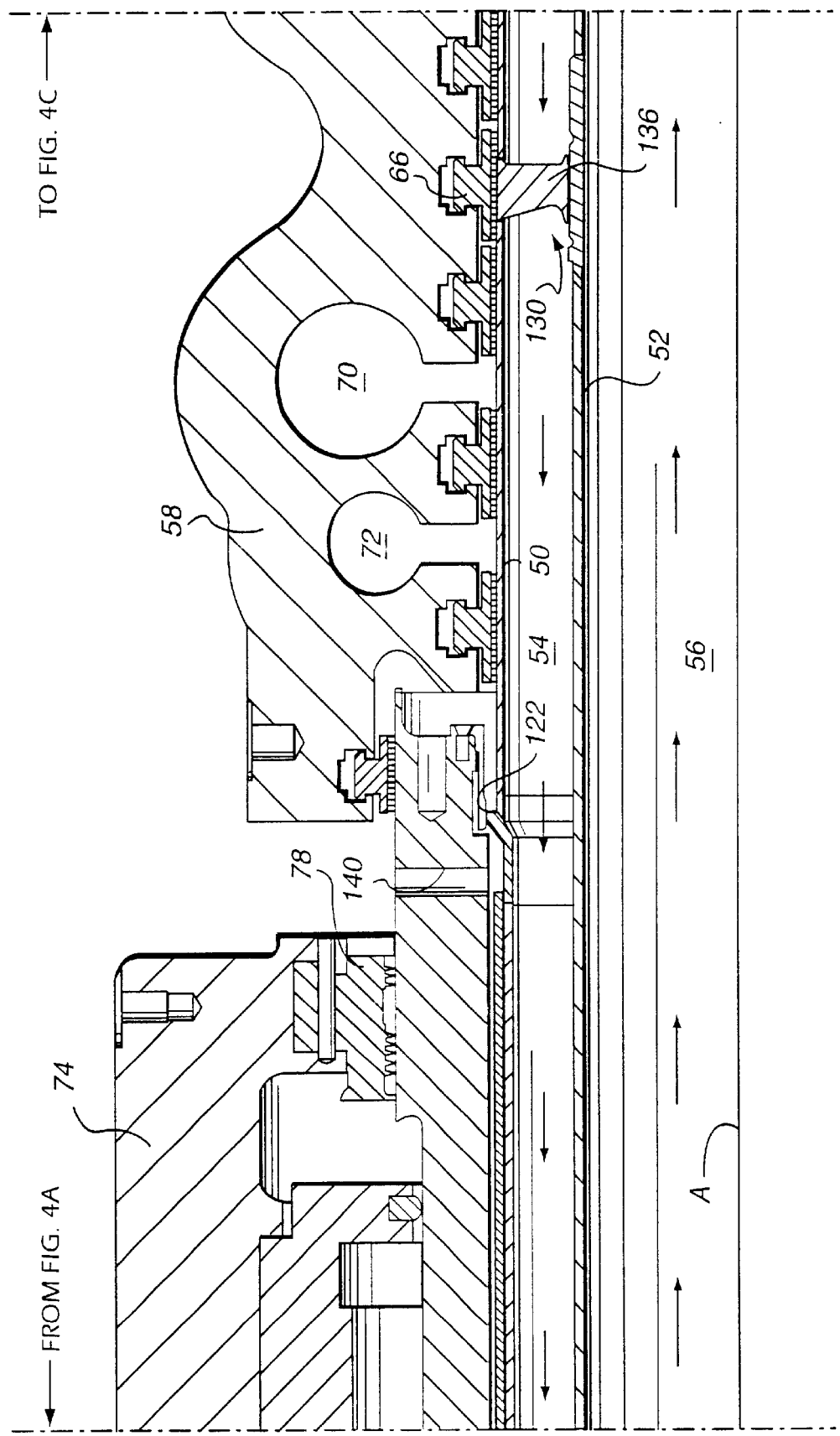

BORE TUBE ASSEMBLY FOR STEAM COOLING A TURBINE ROTOR

This application is a continuation of Ser. No. 09/216,363 filed Dec. 18, 1998.

This invention was made with Government support under Contract No. DE-FC21-95MC31176 awarded by the Department of Energy. The Government has certain rights in this invention.

TECHNICAL FIELD

The present invention relates generally to turbines and particularly to land-based gas turbines for power generation employing closed-circuit steam-cooling paths for cooling the hot gas components and particularly relates to a bore tube assembly facilitating the supply of cooling steam to the hot gas components and return of the spent cooling steam.

BACKGROUND OF THE INVENTION

Steam cooling of hot gas path components, for example, the buckets of a gas turbine, has been proposed in the past and found efficacious in land-based power generating plants. While gas turbines are typically air-cooled, for example, jet engines employ compressor discharge air for cooling the hot gas components, steam cooling is more efficient in that the losses associated with the use of steam as a coolant are not as great as the losses realized by extracting compressor bleed air for cooling purposes. Also, in combined cycle operations, steam cooling is particularly advantageous because the heat energy imparted to the steam as it cools the gas turbine components is recovered as useful work in driving the steam turbine in the combined cycle operation.

In U.S. Pat. No. 5,593,274 of common assignee herewith, there is disclosed a gas turbine having coaxial steam passages for supplying cooling steam to hot gas components of the rotor, for example, the buckets, and returning that spent cooling steam to a return. Various refinements and improvements, however, in the supply and return of the steam for cooling purposes are provided by the present invention.

BRIEF SUMMARY OF THE INVENTION

The present invention provides a bore tube assembly for supplying cooling steam to the hot gas components of the rotor and returning the spent cooling steam in a manner to promote efficiency of the closed-circuit steam path. Various aspects of the bore tube assembly contribute to that improved efficiency. For example, in accordance with the present invention, the bore tube assembly includes a pair of concentric tubes defining a coolant steam supply passage between the outer and inner concentric tubes and a spent cooling steam return passage within the inner tube. The bore tubes form part of the rotating structure of the rotor. Steam is supplied to the supply passage by a steam gland having labyrinth seals on opposite sides of the inlet to the outer tube. The forward ends of the inner and outer tube are coupled to an end cap for turning the axially supplied annular flow of cooling steam in a radial outward direction for delivery to the steam-cooled buckets and turning the spent cooling steam flowing radially inwardly from those buckets in an axial direction for flow through the inner tube to a return. The end cap includes first and second axially spaced sets of a plurality each of circumferentially spaced openings in respective communication with the steam supply passage and spent cooling steam return passage. The first and second sets of openings of the end cap communicate with first and second axially spaced sets of a plurality each of circumferentially spaced, radially extending tubes carried by the rotor for respectively distributing the cooling steam to the steam-cooled buckets and conveying the spent cooling steam from the buckets through the end cap and bore tube assembly to the return. The end cap affords a unique steam flow transition between the radial outer components of the rotor and the bore tube assembly.

Apart from the end cap itself, another aspect of the present invention includes an inner core within the end cap. The inner core has a shaped head or body for directing the spent cooling steam returning from the steam-cooled buckets radially inwardly through the tubes into the axially directed return passage of the inner tube of the bore assembly. The inner core also carries a plurality of vanes for removing any tendency of the returning cooling steam to swirl in the axial return flow passage within the inner tube. That is, the vanes remove the swirling components of flow of the steam and direct the steam substantially in an axial direction.

In another aspect of the present invention, a radiation shield overlies at least a portion of the outer tube between it and the aft shaft to minimize heat transfer from the steam supply passage to the aft main bearing. The shield per se resists thermal radiation to the aft main bearing which might otherwise obtain a temperature above acceptable limits for the bearing pad and oil film of the bearing. Additionally, an air gap is provided between the bore tube and the radiation shield, enabling the shield to provide thermal resistance to heat transfer by conduction. The radiation shield is secured at one end to the outer bore tube, while the other end remains free for axial thermal expansion.

Another aspect of the present invention resides in the provision of a strut ring between the inner and outer tubes of the bore tube assembly which enables thermal expansion and contraction of the inner tube relative to the outer tube. The strut ring includes inner and outer rings, the outer ring preferably being secured by welding to the inner surface of the outer tube of the bore tube assembly. The inner tube is slidable relative to the inner ring of the strut ring to enable thermal axial expansion of the inner tube relative to the strut ring. The strut ring maintains the orientation, i.e., the concentricity of the inner tube relative to the outer tube. Additionally, the strut ring includes a plurality of struts extending between the inner and outer rings and which struts are canted off radii of the strut ring. The canting of the struts enables limited thermal radial expansion of the inner tube relative to the outer tube while maintaining concentricity of the inner and outer tubes. Further, the trailing edges of the struts are angled in an axial downstream direction to shed vortices. Other aspects of the present invention will become apparent upon a review of this specification.

In a preferred embodiment according to the present invention, there is provided in a turbine having a rotor rotatable about an axis including a plurality of turbine wheels mounting turbine buckets, a bore tube assembly for conveying a cooling medium to the buckets of at least one of the turbine wheels and conveying spent cooling medium to a return, comprising elongated outer and inner tubes spaced from one another and concentric about the axis defining first and second passages for respectively conveying the cooling medium in one axial direction and conveying spent cooling medium in an axial direction opposite the one direction, an end cap adjacent one end of the tube assembly having first and second sets of a plurality each of circumferentially spaced openings in communication with the first and second passages, respectively and first and second sets of a plurality each of circumferentially spaced radially extending passageways carried by the rotor in communication with the respective first and second sets of openings in the end cap for distributing the cooling medium to the buckets of the one turbine wheel and conveying the spent cooling medium through the end cap and bore tube assembly to the return.

In a further preferred embodiment according to the present invention, there is provided in a turbine having a rotor rotatable about an axis including a plurality of turbine wheels mounting turbine buckets, a bore tube assembly for conveying a cooling medium to the buckets of at least one of the turbine wheels and conveying spent cooling medium to a return, comprising elongated outer and inner tubes spaced from one another and concentric about the axis defining first and second passages for respectively conveying the cooling medium in one axial direction and conveying spent cooling medium in an axial direction opposite the one direction, first and second sets of a plurality each of circumferentially spaced generally radially extending passageways carried by the rotor in communication with the respective first and second passages for distributing the cooling medium to the buckets of the one turbine wheel and conveying the spent cooling medium through the end cap and bore tube assembly to the return and a bearing journal surrounding at least in part the outer tube, a radiation shield carried by the outer tube for thermally insulating the bearing journal against heat transfer by radiation from the cooling medium flowing through the passages.

In a still further preferred embodiment according to the present invention, there is provided in a turbine having a rotor rotatable about an axis including a plurality of turbine wheels mounting turbine buckets, a bore tube assembly for conveying a cooling medium to the buckets of at least one of the turbine wheels and conveying spent cooling medium to a return, comprising elongated outer and inner tubes spaced from one another and concentric about the axis defining first and second passages for respectively conveying the cooling medium in one axial direction and conveying spent cooling medium in an axial direction opposite the one direction, a strut ring disposed between the inner and outer tubes and having an outer ring and an inner ring interconnected with one another by a plurality of circumferentially spaced struts, one of the inner ring and the outer ring being fixed to one of the inner tube and the outer tube, respectively, with another of the inner ring and the outer ring and another of the inner tube and the outer tube being slidable relative to one another.

Accordingly, it is a primary object of the present invention to provide a novel and improved cooling circuit in the bore tube assembly of a turbine rotor enabling efficient supply of a cooling medium to selected hot gas components of the rotor and return of spent cooling steam.

BRIEF DESCRIPTION OF THE DRAWINGS

FIGS. 4A, 4B and 4C are fragmentary partial enlarged cross-sectional views of the bore tube assembly with the drawing figures forming continuations of one another along the indicated separation lines;

DETAILED DESCRIPTION OF THE INVENTION

Figure 1:
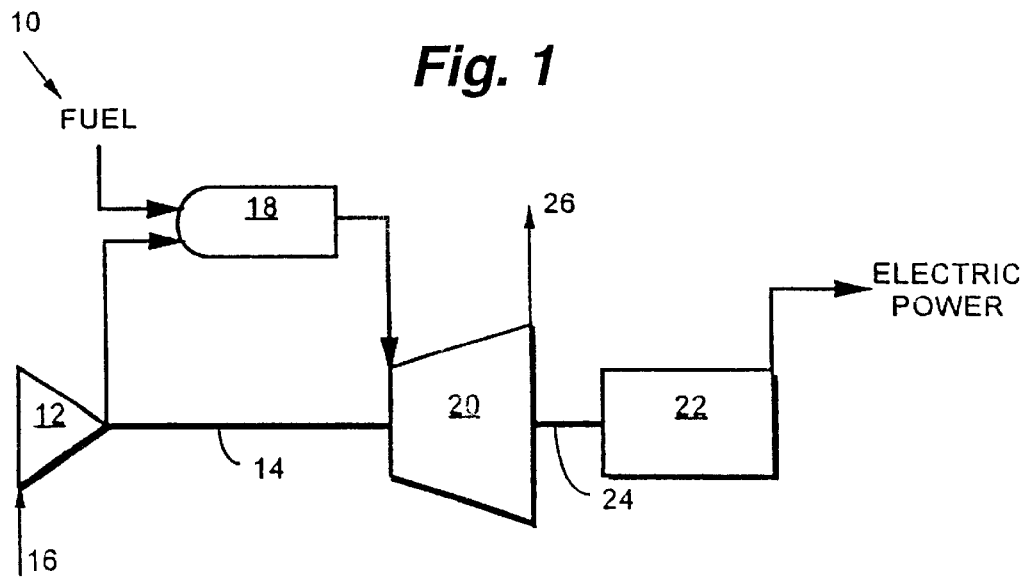
FIG. 1 is a schematic illustration of a power generation system incorporating a gas turbine with bore tube assembly according to the present invention.

FIG. 1 is a schematic diagram of a simple cycle, single-shaft heavy-duty gas turbine 10 incorporating the present invention. The gas turbine may be considered as comprising a multi-stage axial flow compressor 12 having a rotor shaft 14. Air enters the inlet of the compressor at 16, is compressed by the axial flow compressor 12 and then is discharged to a combustor 18 where fuel such as natural gas is burned to provide high-energy combustion gases which drive the turbine 20. In the turbine 20, the energy of the hot gases is converted into work, some of which is used to drive the compressor 12 through shaft 14, with the remainder being available for useful work to drive a load such as a generator 22 by means of rotor shaft 24 for producing electricity. A typical simple cycle gas turbine will convert 30 to 35% of the fuel input into shaft output. All but 1 to 2% of the remainder is in the form of exhaust heat which exits turbine 20 at 26. Higher efficiencies can be obtained by utilizing the gas turbine 10 in a combined cycle configuration in which the energy in the turbine exhaust stream is converted into additional useful work.

Figure 2:
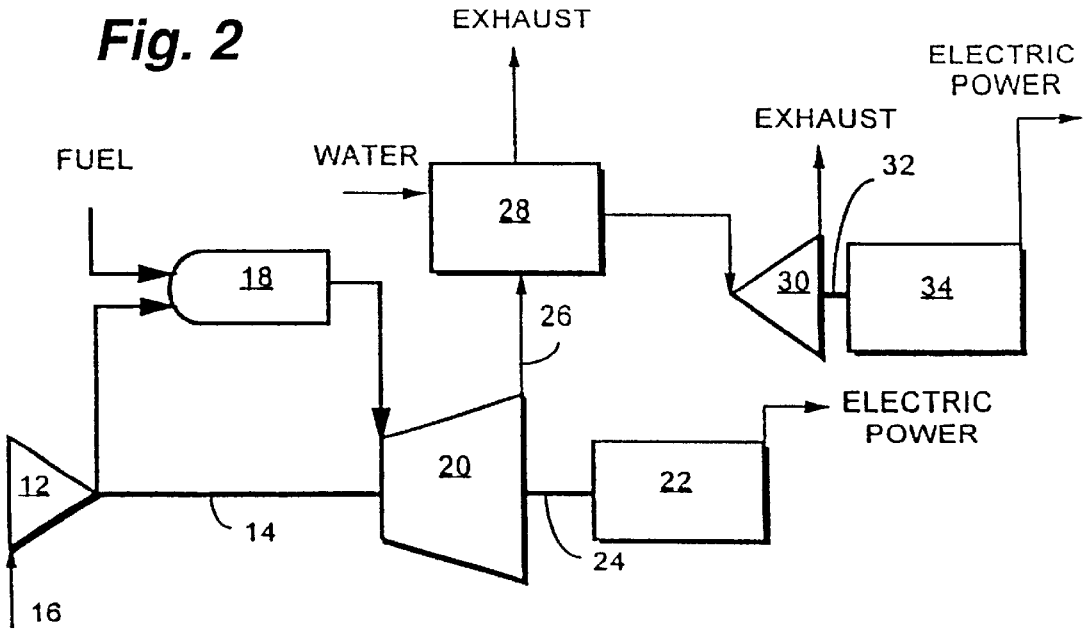
FIG. 2 is a schematic diagram of a combined cycle system incorporated in the present invention and employing a gas turbine and heat recovery steam generator for greater efficiency.

FIG. 2 represents a combined cycle in its simplest form, in which the exhaust gases exiting turbine 20 at 26 enter a heat recovery steam generator 28 in which water is converted to steam in the manner of a boiler. Steam thus produced drives one or more steam turbines 30 in which additional work is extracted to drive through shaft 32 an additional load such as a second generator 34 which, in turn, produces additional electric power. In some configurations, turbines 20 and 30 drive a common generator. Combined cycles producing only electrical power are generally in the 50 to 60% thermal efficiency range and using a more advanced gas turbine, of which the present tube assembly forms a part, permits efficiencies in excess of 60%.

Figure 3:
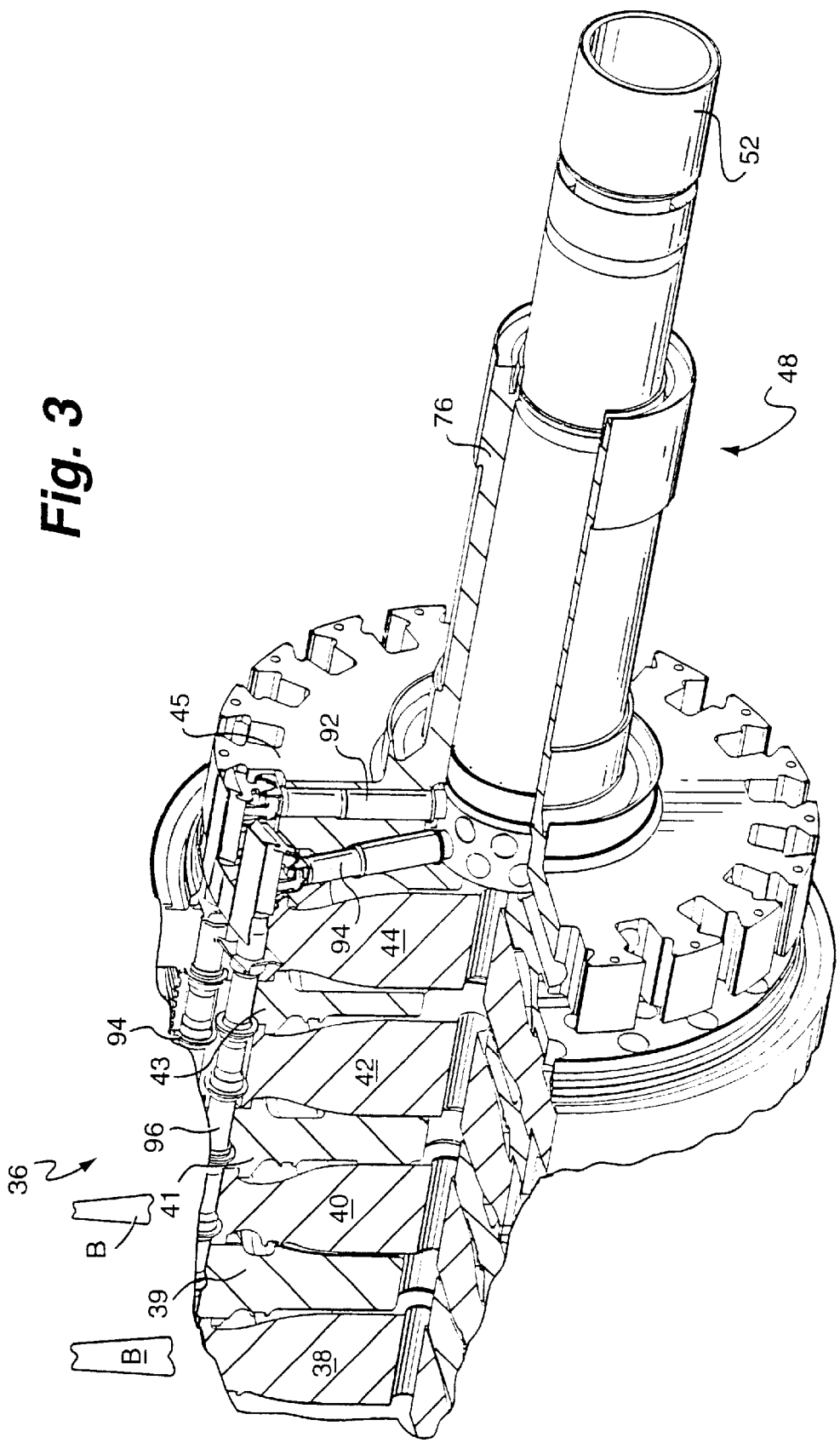
FIG. 3 is a fragmentary perspective view with portions broken out and in cross-section of a bore tube assembly and a portion of the main rotor constructed in accordance with the present invention.

Referring to FIG. 3, the turbine section, generally indicated 36, of the rotor shaft 24 is in part illustrated. The turbine section 36 includes a number of stages including four successive stages comprising turbine wheels 38, 40, 42 and 44 mounted to and forming part of the rotor shaft for rotation therewith, each carrying a row of buckets, two buckets B being illustrated for wheels 38 and 40, respectively, which buckets project radially outwardly of the wheels. The buckets are, of course, arranged alternately between fixed nozzles, also not shown. Between the wheels 38, 40, 42 and 44, there are provided spacer disks 39, 41, 43. A coolant supply and return aft disk 45 forming an integral part of an aft shaft 76 is provided on the aft side of the last stage turbine wheel 44. It will be appreciated that the wheels and disks are secured to one another by a plurality of circumferentially spaced, axially extending bolts, not shown, as is conventional in turbine construction.

A bore tube assembly according to the present invention is generally designated 48. Assembly 48 forms part of the rotor, is mounted for rotation about the rotor axis A and is connected to the cooling support and return aft disk 45. The bore tube assembly and aft disk 45 cooperate to provide a flow of a cooling medium, e.g., steam, to the turbine buckets of at least one of the turbine stages and preferably to the first two stages of the turbine and a passage for flow of the spent cooling medium, e.g., steam, to a return. The cooling system may be provided as part of a closed-circuit steam cooling supply and return system in a combined cycle system, i.e., split off from the high pressure steam turbine exhaust or may be supplied from an existing in-plant supply.

The bore tube assembly 48 includes an outer tube 50 and an inner tube 52 concentric with outer tube 50 about the axis of rotation of the rotor shaft 24. The outer and inner tubes 50 and 52, respectively, define an annular cooling steam supply passage 54, while the inner tube 52 provides a spent cooling steam passage 56. Referring to FIGS. 4B and 4C, a steam gland 58 is disposed about the bore tube assembly. It will be appreciated that the steam gland 58 is fixed and the bore tube assembly rotates about the rotor shaft axis A. A steam plenum 60 connected to a supply of steam from a suitable source, not shown, lies in communication with a steam inlet 62 formed through the outer tube 50 for supplying cooling steam to the passage 54 between the outer and inner tubes 50 and 52. Labyrinth-type seals 64 and 66, preferably spring-biased, are provided on opposite sides of the steam gland 58 for sealing about the outer tube 50. A variation on this design could employ brush seals instead of labyrinth seals. The aft end of the steam gland 58 is connected with a stationary steam pipe schematically illustrated by return R for the flowing spent cooling steam. The steam gland also includes leakage steam plenums 70 and 72 for collecting steam leaking past the labyrinth seals such that the steam will not flow forwardly to the aft main bearing 74.

Figure 4A:
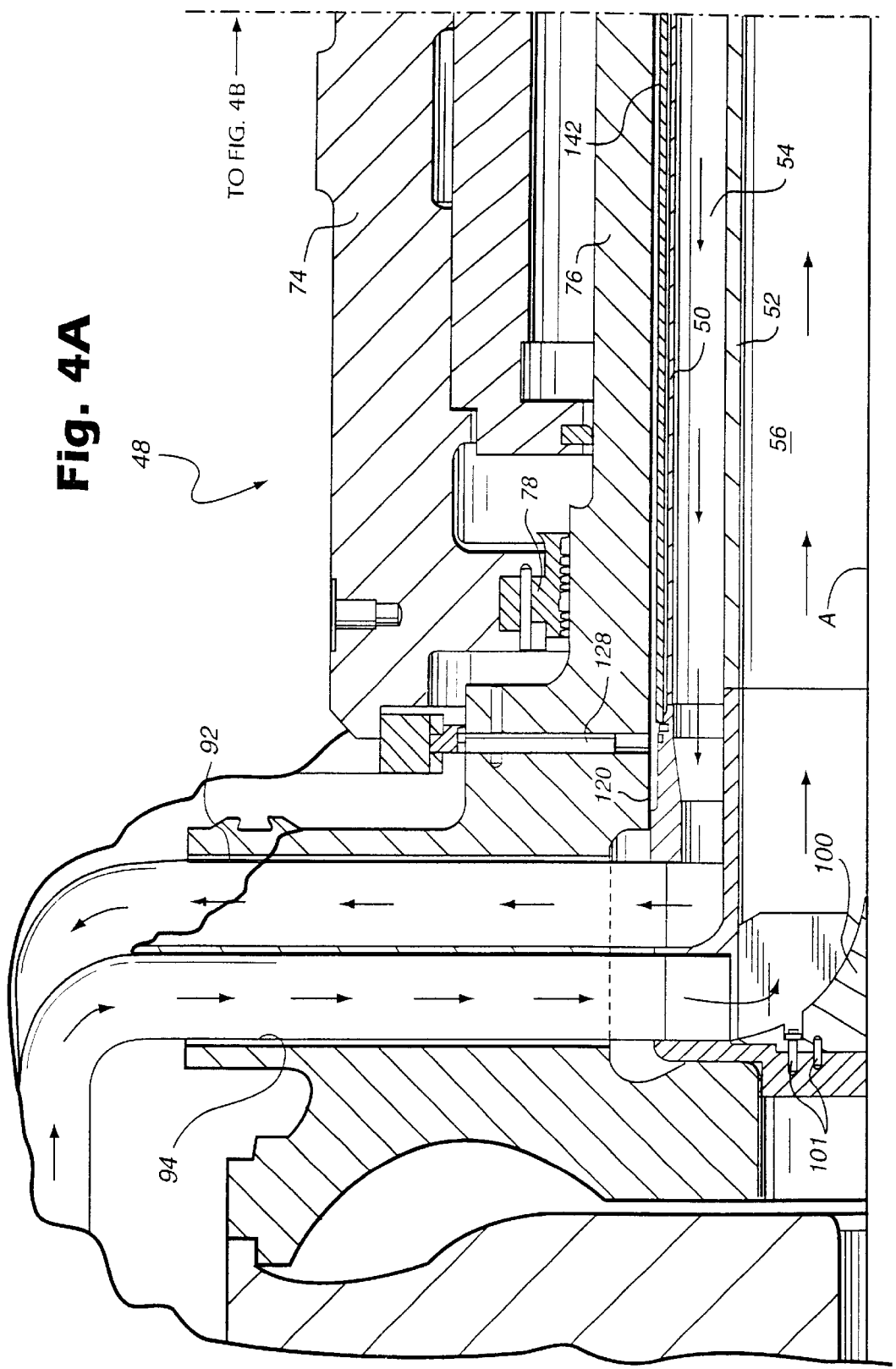
Figure 4C:
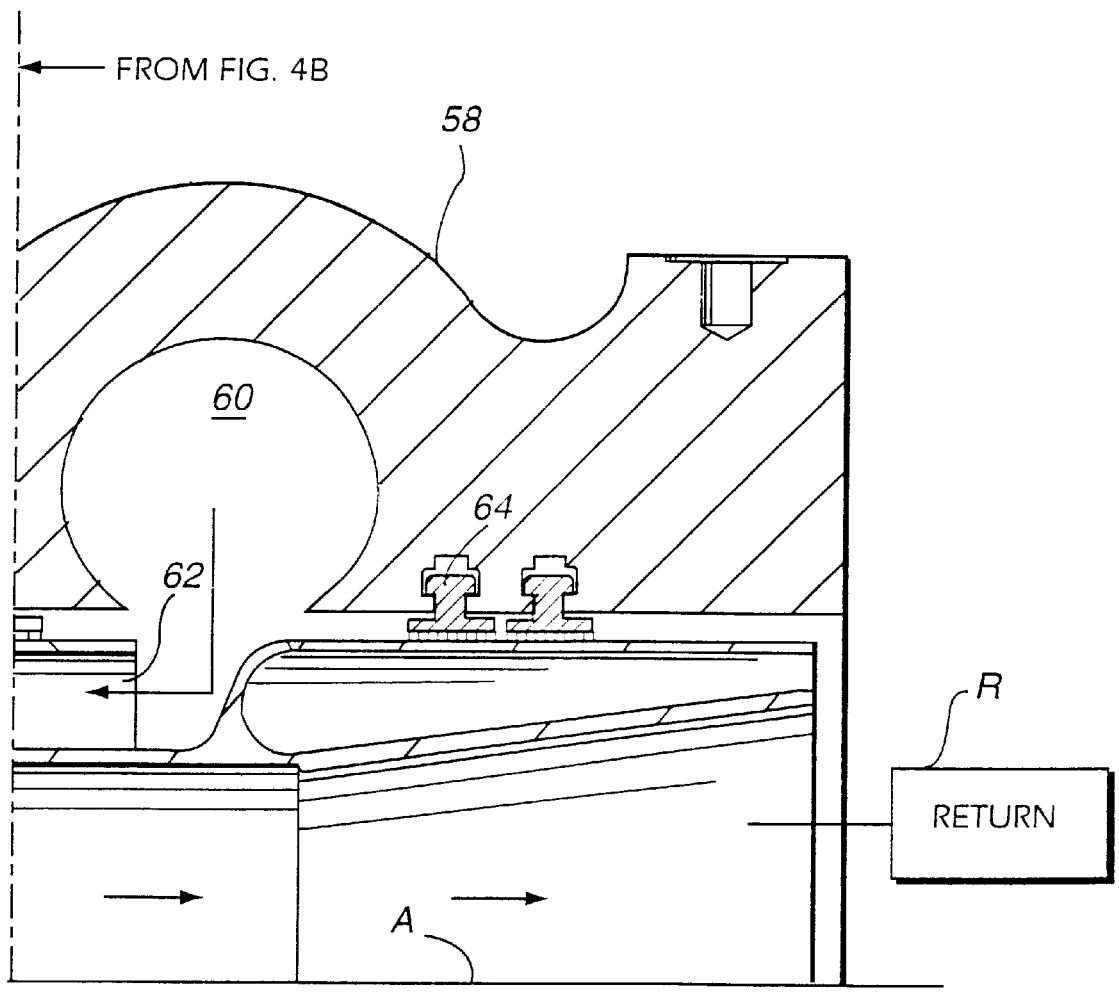

Referring to FIGS. 4A and 4B, the bearing 74 is a conventional bearing and includes the aft shaft 76, integral with disk 48, shaft 76 being rotatable with the bore tube assembly 48. Various seals are disposed at opposite ends of the aft main bearing cooperate with the aft shaft to seal the main bearing.

Figure 5:
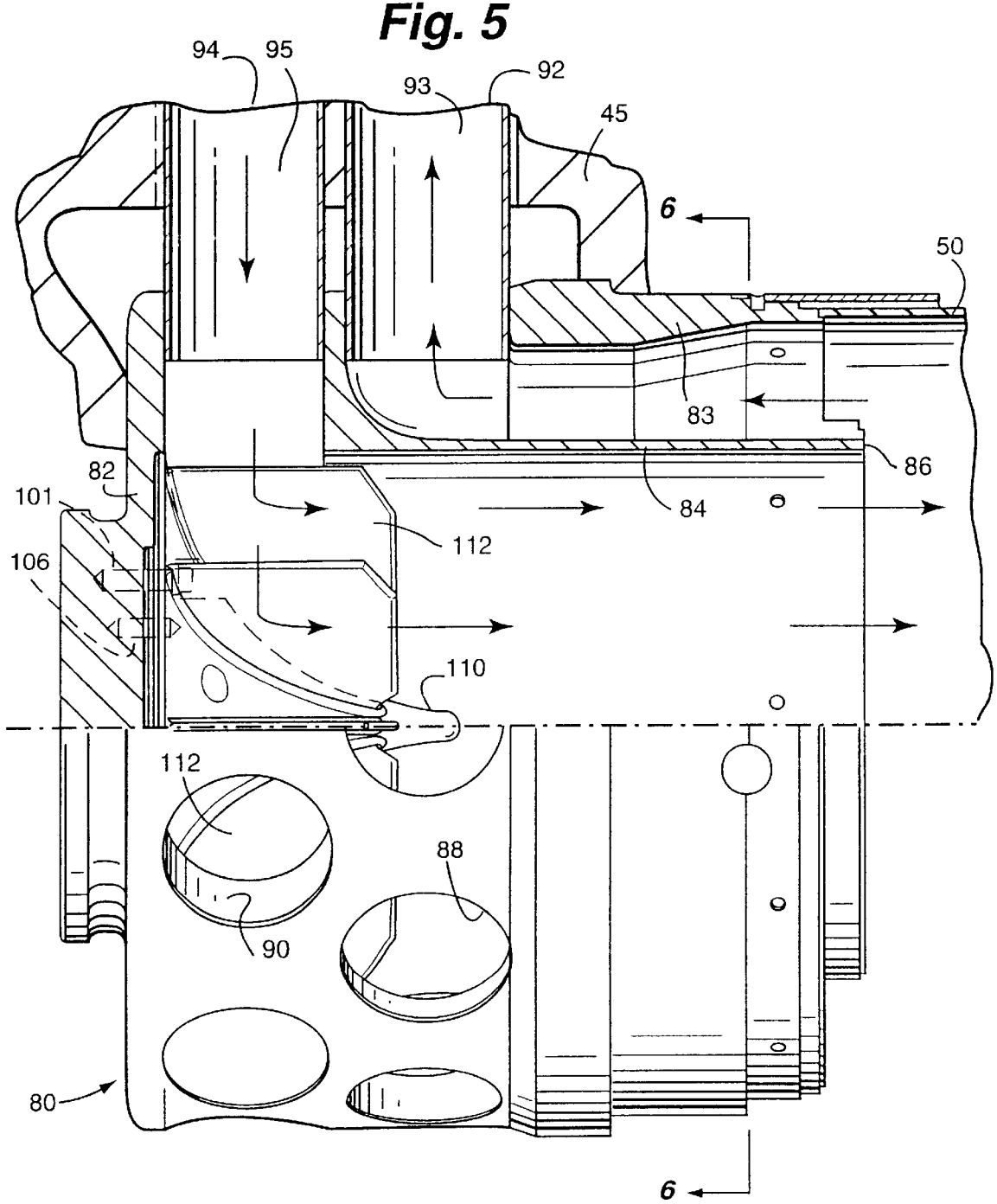
FIG. 5 is a fragmentary enlarged elevational view with parts broken out and in cross-section of the forward end of the bore tube assembly and particularly illustrating the end cap and inner core.

Referring to FIGS. 4A and 5, the forward end of the bore tube assembly includes an end cap, generally designated 80. End cap 80 includes an outer generally cylindrical member secured to the aft disk 45 and having a closed end 82 and an opposite open end secured, e.g., by welding, to the outer tube 50 of the bore tube assembly. Forming an integral part of the end cap 80 are cylindrical outer and inner sleeves 83 and 84. The aft end 86 of inner sleeve 84 is secured to the forward end of the inner tube 52. The aft end of the outer sleeve 83 is secured, e.g., by welding, to the forward end of the outer tube 50. Consequently, the cylindrical open end of the end cap defines continuations of the coolant supply passage 54 and spent coolant return passage 56.

A first set of a plurality of circumferentially spaced openings 88 lying in a diametrical plane about axis A are provided about the outer sleeve 83 of the end cap 80. The openings 88 lie in communication with the first passage 54 of the bore tube assembly and its continuation through the concentric inner and outer sleeves of the end cap. A second set of circumferentially spaced openings 90, preferably axially spaced from the first set of openings 88, and also lying in a second diametrical plane, is provided adjacent the forward end of end cap 80. The second set of openings 90 lie in communication with the spent coolant return passage 56 via inner sleeve 84.

Referring back to FIGS. 3 and 4A, a plurality of circumferentially spaced, radially extending tubes 92 are disposed in the aft disk 45 and lie in respective communication with the first set of openings 88 of end cap 80. The opposite ends of the tubes 92 of the first set thereof lie in communication with supply tubes 94 (FIG. 3) extending within the rotor in an axial direction for supplying steam to the buckets of at least the first-stage turbine wheel, preferably both the first and second stage turbine wheels, for cooling the buckets thereof. A second set of a plurality of circumferentially spaced tubes 94 extend radially in the aft disk 45 in communication at their radial inner ends with respective openings 90 of the end cap 80. The second set of tubes 94 lie in communication with return tubes 96 also extending within the rotor in an axial direction for returning spent cooling steam from the cooled buckets to the tubes 94 and into the end cap 80 by way of openings 90. It will be appreciated that the tubes 92 and 94 thus constitute first and second axially spaced sets of a plurality each of circumferentially spaced extending passageways 93, 95 in communication with the respective first and second sets of openings 88, 90 in the end cap for respectively conveying cooling medium from passage 54 through end cap 80 to the buckets and returning spent cooling medium from the buckets through the bore tube assembly, including end cap 80 and inner tube 52, along passage 56.

Figure 6:
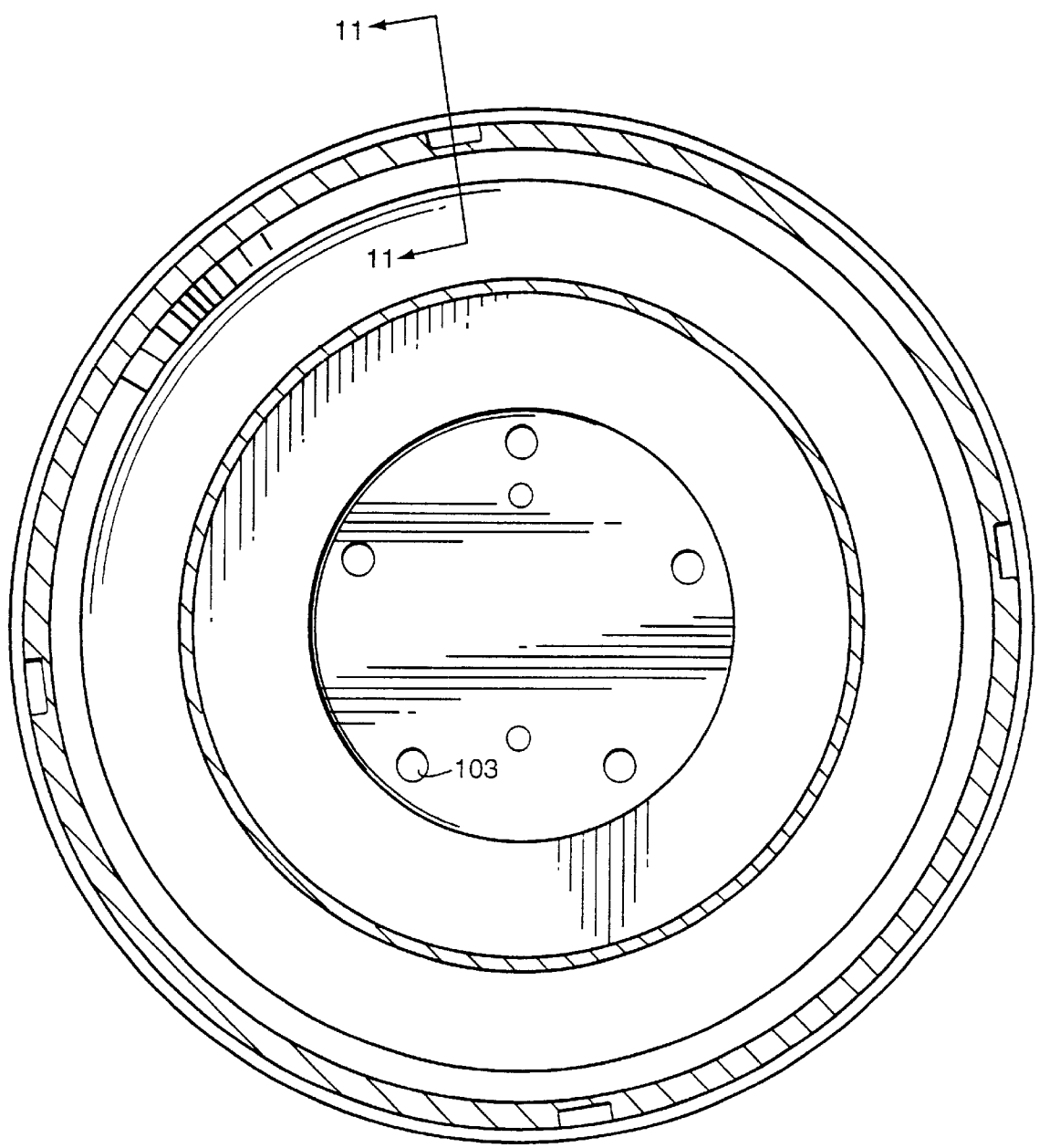
FIG. 6 is a cross-sectional view thereof taken generally about on line 6—6 in FIG. 5.
Figure 7:
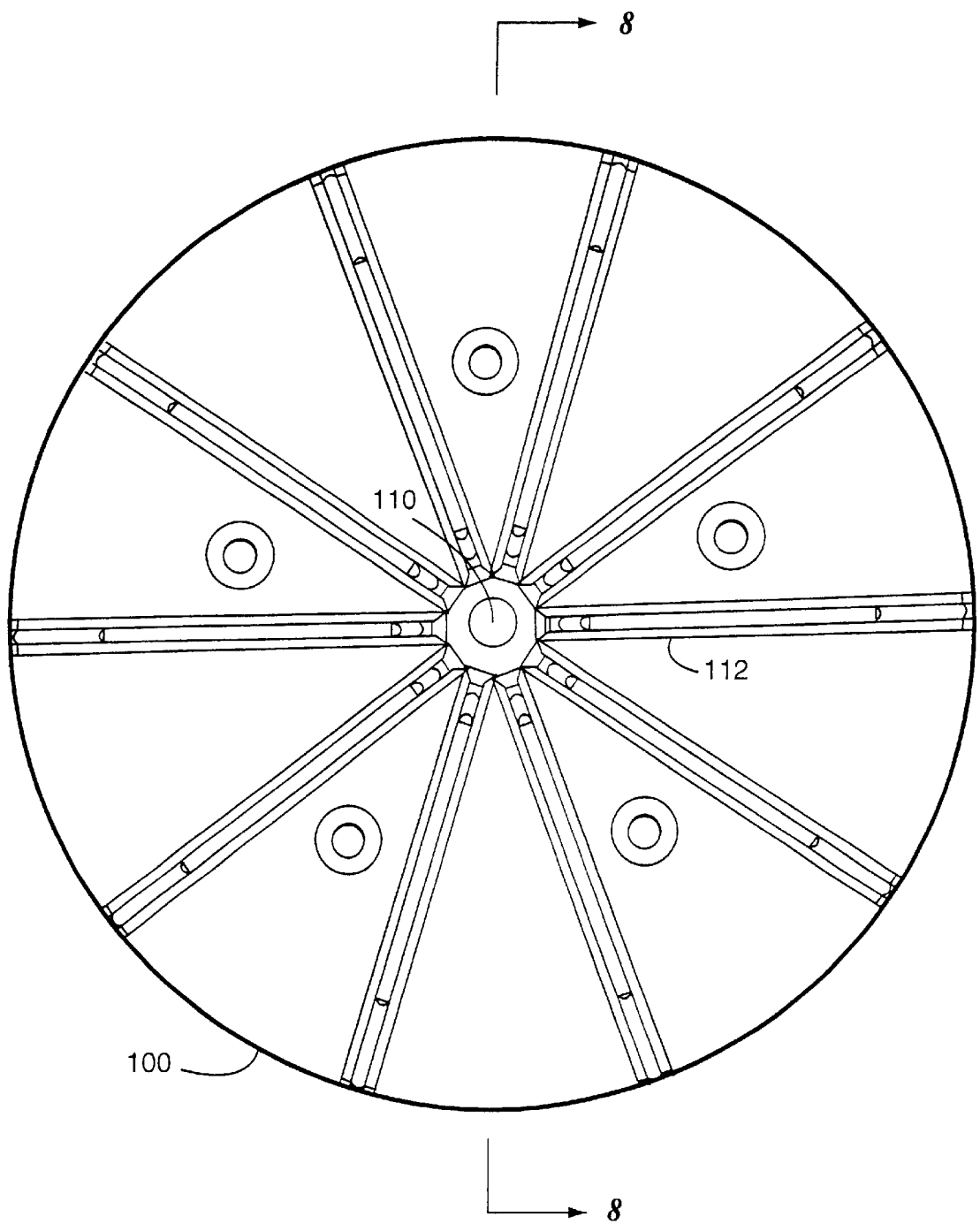
FIG. 7 is an end elevational view of the inner core illustrated in FIG. 5.
Figure 8:
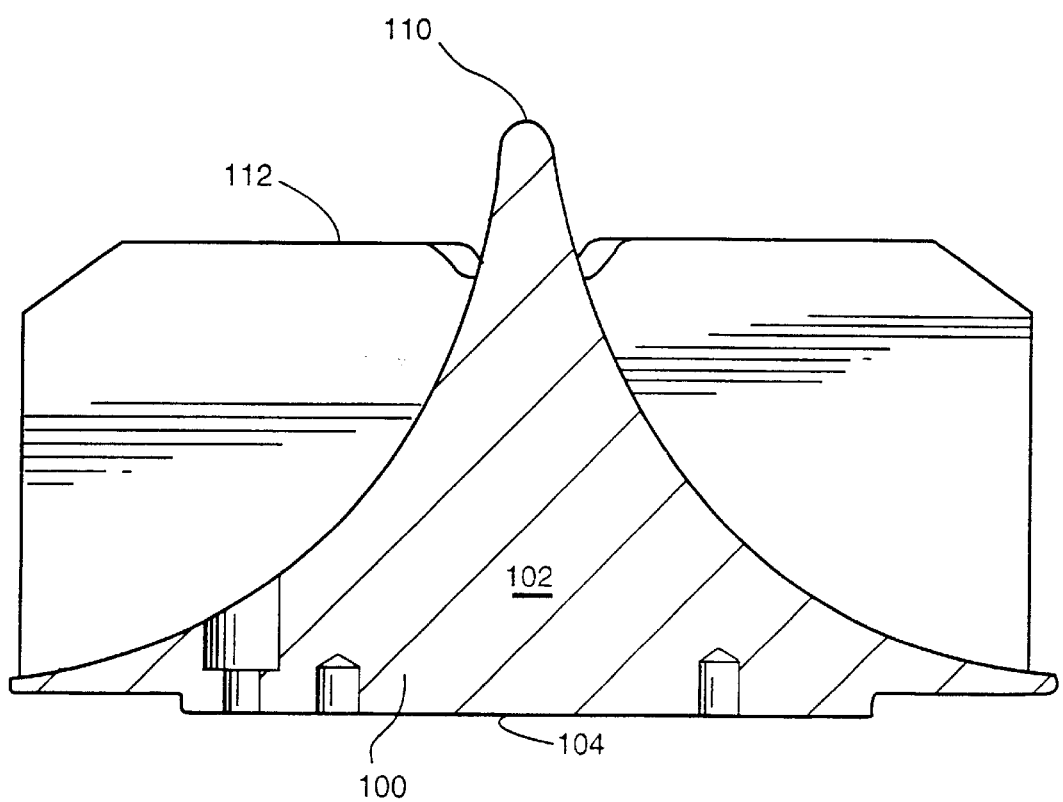
FIG. 8 is a cross-sectional view thereof taken about on line 8—8 in FIG. 7.
Figure 9:
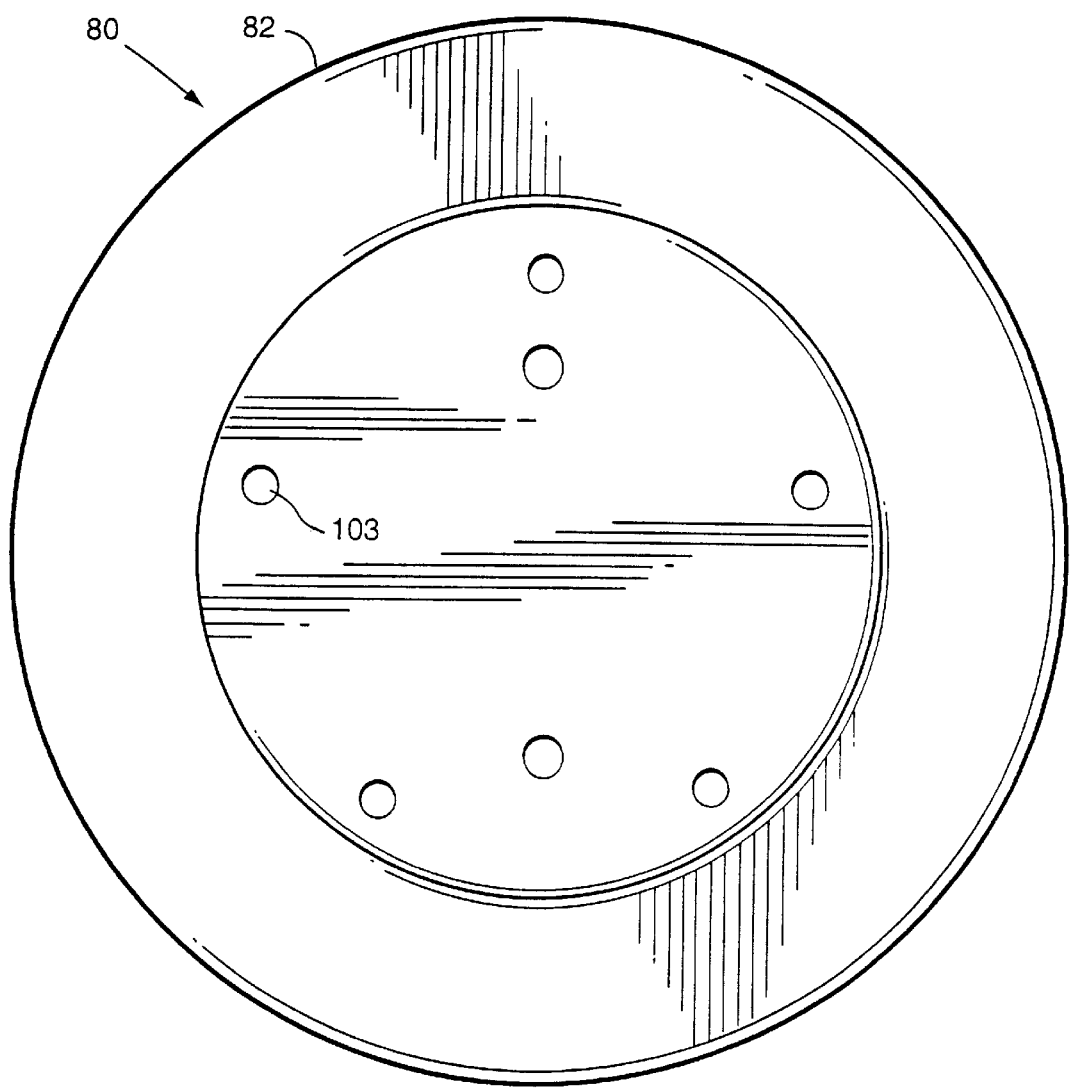
FIG. 9 is an elevational view of the forward face of the inner core.

Within the end cap assembly, there is provided an inner core 100. Inner core 100, as best illustrated in FIG. 8, includes a central body 102 having a flat base 104 for securement to the inside end face of the end cap 80 by bolted connections, five bolt holes 103 being illustrated in FIGS. 6 and 7 (a single bolt 101 therefor being illustrated in FIGS. 4A and 5). The inner core 100 is a forged piece, preferably formed of Inconel 718. Casting of the inner core is an alternative method. Additionally, two dowel pins, one being illustrated at 106 in each of FIGS. 4A and 5, are employed to carry the shear load between the inner core 100 and end cap 80, the bolts 101 carrying the tension load.

Referring specifically to FIG. 8, the body 102 of the inner core 100 is generally arcuate and conically-shaped terminating in an apex 110, the axis of the conical body 102 lying on the rotor axis A. Additionally, as illustrated in FIGS. 7 and 8, a plurality of vanes 112 are provided extending from the curved conical body 102 to the margin of the inner core 100. As illustrated in FIGS. 4A and 5, and with the inner core 100 secured to the interior face of the end cap 80, it will be appreciated that the inner core 100 resides wholly within inner sleeve 84. Also, the vanes 112 are spaced from one another such that the return flow through tubes 94 flows between the vanes. With this arrangement, return flow of spent coolant steam enters the inner sleeve 84 through openings 90 for impact against the curved conical surface of the inner core body 102 which transitions the spent cooling steam flow from a generally radially inwardly directed flow to an axially extending flow within the inner tube 52. The vanes 112 serve to remove any tendency of the radially inwardly directed flow of spent cooling steam to have swirl components. Thus, the vanes straighten the flow for substantially axial flow minimizing or precluding radial flow within inner sleeve 84 and passage 56.

Referring to another aspect of the present invention, the aft shaft is secured to the bore tube assembly by a pair of forward and aft interference fits. For example, the forward interference fit is indicated at 120 in FIG. 4A, while the aft interference fit is indicated at 122 in FIG. 4B. The bore tube assembly must be held centered and attached to the aft shaft at all operating conditions of the turbine. Otherwise, destructive imbalance and subsequent vibrations could occur. A pair of interference fits between the aft shaft and the bore tube assembly at opposite ends of the aft shaft prevent such imbalance and vibration.

Figure 10:
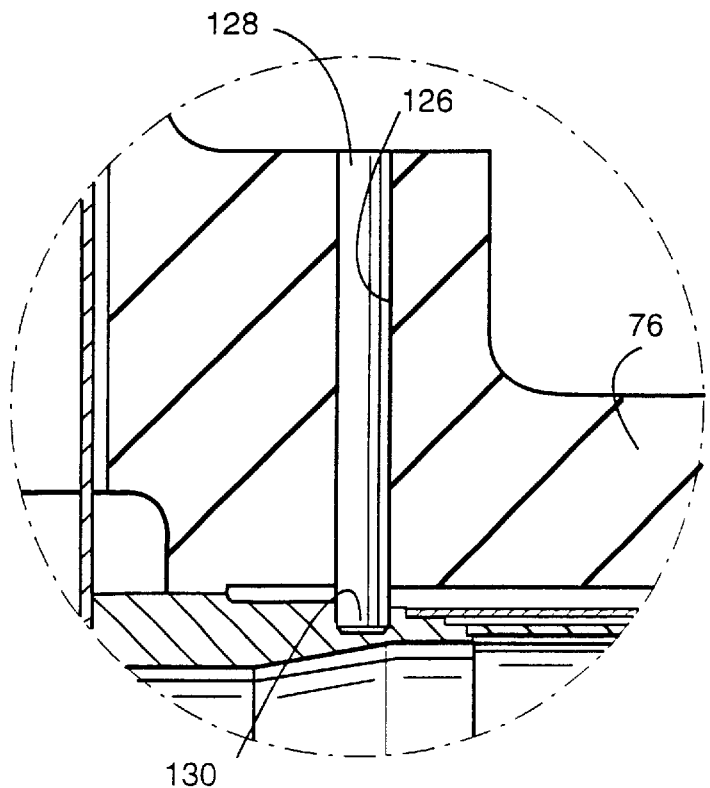
FIG. 10 is an enlarged cross-sectional view illustrating a pin connection between the end cap and return disk of the bore tube assembly.
Figure 11:
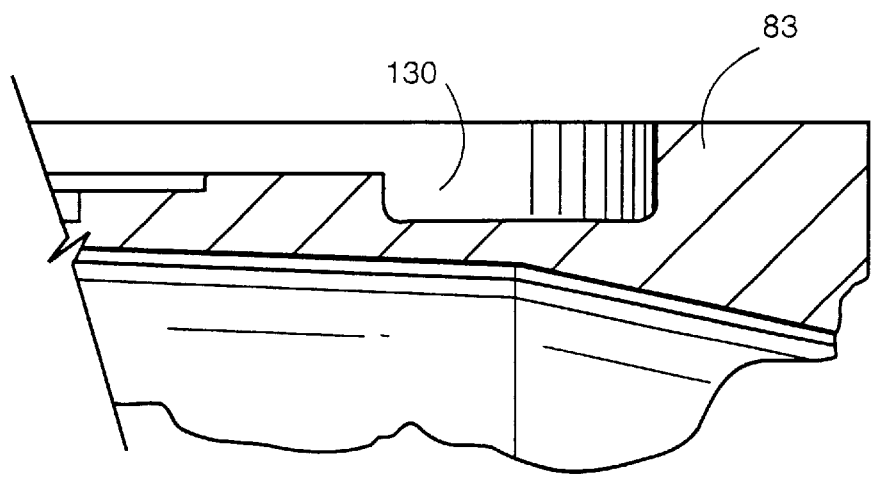
FIG. 11 is an enlarged cross-sectional view of the end of the outer sleeve of the end cap and a recess for the pinning connection with the aft shaft.

In another aspect of the present invention, the bore tube assembly must be prevented from twisting within the aft shaft. This is accomplished by using radial pins through the aft shaft engaging the forward end of the bore assembly. For example, as illustrated in FIG. 10, the aft shaft 76 has a plurality of apertures 126 at circumferentially spaced locations for receiving pins 128. The inner ends of the pins 128 engage in circumferentially spaced recesses 130 formed on the outer peripheral surface of the outer sleeve 83 of the end cap 80. It will be appreciated that these pins engaging in the recesses prevent both circumferential and axial movement of the aft shaft relative to the bore tube assembly.

Figure 12:
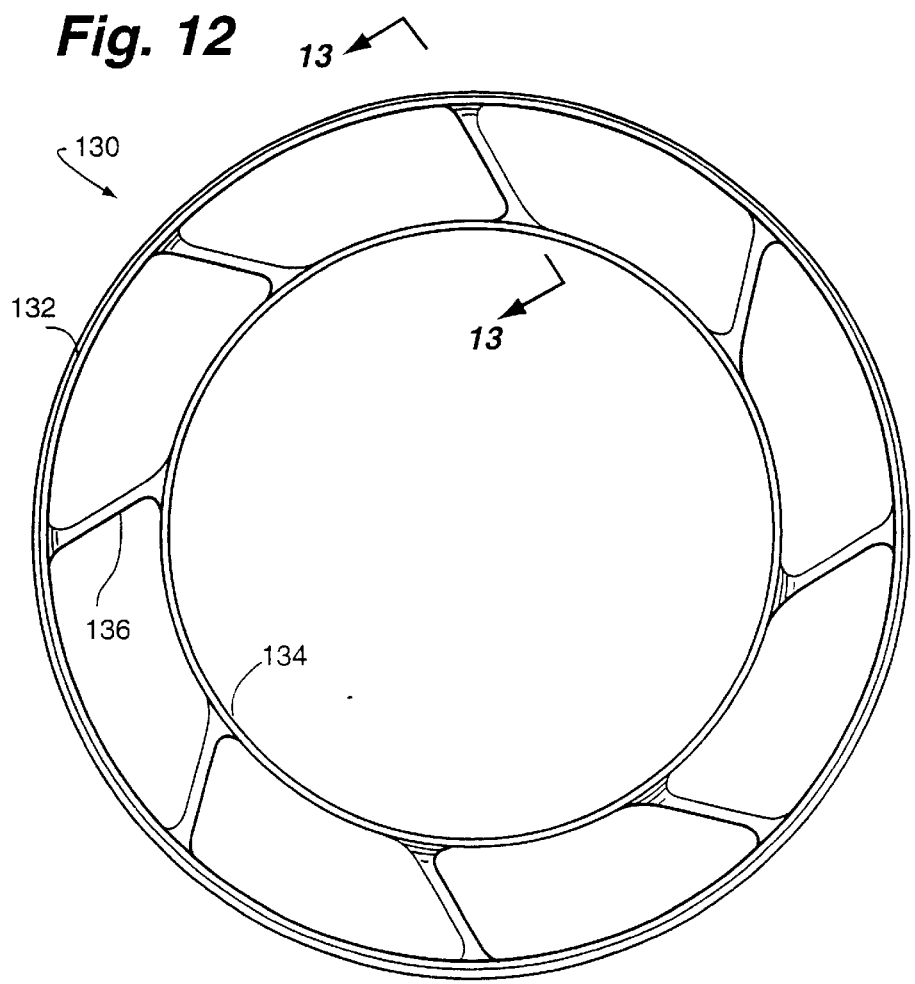
FIG. 12 is an enlarged axial view of a strut ring used in the bore tube assembly.
Figure 13:
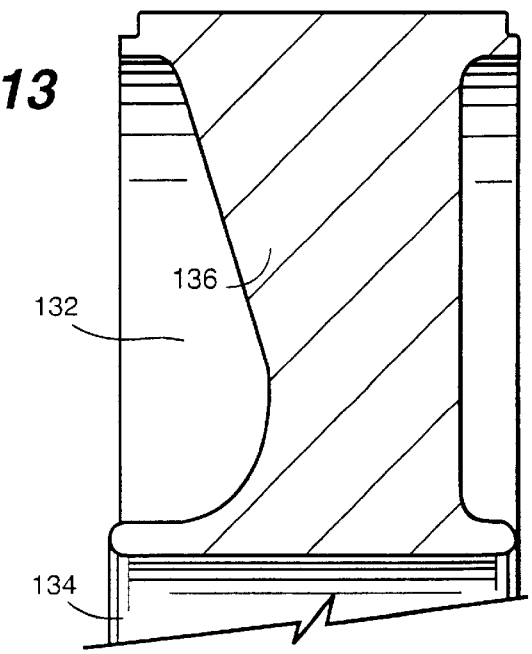
FIG. 13 is a cross-sectional view thereof taken generally about on line 13—13 in FIG. 12.

Referring now to FIGS. 4B, 12 and 13, it will be appreciated that the temperatures of the inner and outer tubes forming the bore assembly are different from one another during operation because the outside concentric passage 54 supplies cooling steam, while the spent return steam flows in passage 56 at a much higher temperature. As a consequence, the inner tube 52 will tend to thermally expand both axially and radially. To accommodate this thermal expansion in both axial and radial directions, a strut ring, generally indicated 130, is disposed between the outer and inner tubes 50 and 52, respectively. Referring to FIG. 12, the strut ring includes an outer ring 132 and an inner ring 134 connected one to the other by a plurality of circumferentially spaced struts 136. The outer ring 132 is preferably secured to the outer tube 50, for example, by welding. The inner ring 134, however, is slidably connected to the inner tube 52. The reverse arrangement is also possible, i.e., the inner ring being secured to the inner tube and the outer ring being slidable relative to the outer tube, but is not preferred. With this arrangement, the inner tube is maintained concentric with the outer tube 50 while simultaneously thermal expansion of the inner tube in an axial direction is accommodated by relative sliding movement between tube 52 and inner ring 134. It will be appreciated that the inner and outer tubes are fixed to the rotor at their forward ends and, consequently, the inner tube can axially expand in an aft direction relative to the outer tube. The fit between the inner ring 134 and the inner tube 52 includes a hard surface coating ground to very close tolerances.

To enable thermal expansion of the inner tube 52 in a radial direction, the struts 136 extend between the inner and outer rings 134 and 132, respectively, at angles inclined to the radii, as illustrated in FIG. 2. That is, acute angles form between radii of the strut ring and the struts 136. The otherwise generally radial forces applied to the radial extending struts 136 by radial outward thermal expansion of the inner tube 52 are mitigated by angling the struts relative to the radii. Thus, the inner ring 134 tends to rotate slightly and the struts tend to flex as the inner tube 52 expands in a radial direction under thermal loading.

Another aspect of the invention resides in the shape of the struts 136. As illustrated in FIG. 13, the upstream or leading edges of the struts 136 lie generally in a plane normal to the axis of the flow passage 54. However, the trailing edges of struts 136 are angled relative to the axis, i.e., angled in a direction generally radially outwardly from the inner tube and in a downstream direction. That is, with the leading edges extending normal to the axis, the trailing edges are canted so that the outer diameter of each strut has a longer axial length than its inner diameter. The particular shape of the struts is significant as the struts in this configuration and orientation tend to reduce vortex shedding and vibration as the cooling steam flows along passage 54.

As illustrated in FIG. 4B, there is also a plurality of air inlet passages 140 through the aft shaft 76. A thermal radiation shield 142 is disposed about outer tube 50 and is spaced from the aft shaft 76 to provide an axially extending concentric gap for receiving the air flow from air passages 140. The air passing through this annular air passage exits the rotor through a plurality of holes in the same axial plane as the pins 128 at the forward end of the bore tube assembly. An annular air gap lies between the thermal radiation shield 142 and outer bore tube 50. Consequently, the shield 142 precludes heat transfer by radiation from the cooling steam in passage 54 to the aft main bearing. Also, the air gap and the air passage form thermal insulators between the cooling steam in passage 54 and the main bearing.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. In a turbine having a rotor rotatable about an axis including a plurality of turbine wheels mounting turbine buckets, a bore tube assembly for conveying a cooling medium to the buckets of at least one of said turbine wheels and conveying spent cooling medium to a return, comprising:

elongated outer and inner tubes spaced from one another and concentric about said axis defining first and second passages for respectively conveying the cooling medium in one axial direction and conveying spent cooling medium in an axial direction opposite said one direction;

an end cap adjacent one end of said tube assembly having first and second sets of a plurality each of circumferentially spaced openings in communication with the first and second passages, respectively; and first and second sets of a plurality each of circumferentially spaced radially extending passageways carried by said rotor in communication with said respective first and second sets of openings in said end cap for distributing the cooling medium to the buckets of said one turbine wheel and conveying the spent cooling medium through the end cap and bore tube assembly to the return.

2. A bore tube assembly according to claim 1 wherein said first passage lies between said inner and outer tubes and said second passage lies within said inner tube, first and second sets of openings in said end cap are axially spaced from one another and said first and second sets of passageways are axially spaced from one another.

3. A bore tube assembly according to claim 1 including an inner core disposed in the end cap for transitioning the spent cooling medium flowing radially into said end cap from said second radially directed set of passageways into a substantially axially directed flow of spent cooling medium in the second passage.

4. A bore tube assembly according to claim 3 wherein said inner core has a plurality of circumferentially spaced vanes for substantially removing swirl components of flow of the spent cooling medium as the spent cooling medium transitions between radial flow and axial flow in said passageways and second passage, respectively, thereby providing substantially axial flow within said second passage substantially without swirl components of flow.

5. A bore tube assembly according to claim 1 including a bearing journal surrounding at least in part said outer tube, a radiation shield carried by said outer tube for thermally insulating said bearing journal against heat transfer by radiation from the cooling medium flowing through said passages.

6. A bore tube assembly according to claim 5 wherein the journal bearing includes an aft shaft defining with said radiation shield a thermally insulating air gap therebetween.

7. A bore tube assembly according to claim 5 wherein said radiation shield is secured at one end to the outer tube, an opposite end of said shield being free for axial movement relative to said outer tube to enable thermal axial expansion and contraction of said radiation shield relative to said outer tube.

8. A bore tube assembly according to claim 1 including a strut ring disposed between said inner and outer tubes and having an outer ring and an inner ring interconnected with one another by a plurality of circumferentially spaced struts, one of said inner ring and said outer ring being fixed to one of said inner tube and said outer tube, respectively, with another of said inner ring and said outer ring and another of said inner tube and said outer tube being slidable relative to one another.

9. A bore tube assembly according to claim 8 wherein said outer ring is fixed to said outer tube and said inner ring and said inner tube are slidable relative to one another, enabling axial thermal expansion of said inner tube relative to said outer tube.

10. A bore tube assembly according to claim 9 wherein said struts extend between said inner ring and said outer ring at angles offset from radii thereof enabling thermal expansion of said inner tube in a radial outward direction relative to said outer tube.

11. A bore tube assembly according to claim 8 wherein the struts have leading and trailing edges facing respective upstream and downstream directions of the cooling medium flow in said first passage, said trailing edges extending from one of said rings in radial and axial downstream directions.

12. In a turbine having a rotor rotatable about an axis including a plurality of turbine wheels mounting turbine buckets, a bore tube assembly for conveying a cooling medium to the buckets of at least one of said turbine wheels and conveying spent cooling medium to a return, comprising:

elongated outer and inner tubes spaced from one another and concentric about said axis defining first and second passages for respectively conveying the cooling medium in one axial direction and conveying spent cooling medium in an axial direction opposite said one direction;

first and second sets of a plurality each of circumferentially spaced generally radially extending passageways carried by said rotor in communication with said respective first and second passages for distributing the cooling medium to the buckets of said one turbine wheel and conveying the spent cooling medium through the end cap and bore tube assembly to the return; and a bearing journal surrounding at least in part said outer tube, a radiation shield carried by said outer tube for thermally insulating said bearing journal against heat transfer by radiation from the cooling medium flowing through said passages.

13. A bore tube assembly according to claim 12 wherein the journal bearing includes an aft shaft defining with said radiation shield a thermally insulating air gap therebetween.

14. A bore tube assembly according to claim 12 wherein said radiation shield is secured at one end to the outer tube, an opposite end of said shield being free for axial movement relative to said outer tube to enable thermal axial expansion and contraction of said radiation shield relative to said outer tube.

15. In a turbine having a rotor rotatable about an axis including a plurality of turbine wheels mounting turbine buckets, a bore tube assembly for conveying a cooling medium to the buckets of at least one of said turbine wheels and conveying spent cooling medium to a return, comprising:

elongated outer and inner tubes spaced from one another and concentric about said axis defining first and second passages for respectively conveying the cooling medium in one axial direction and conveying spent cooling medium in an axial direction opposite said one direction;

a strut ring disposed between said inner and outer tubes and having an outer ring and an inner ring interconnected with one another by a plurality of circumferentially spaced struts, one of said inner ring and said outer ring being fixed to one of said inner tube and said outer tube, respectively, with another of said inner ring and said outer ring and another of said inner tube and said outer tube being slidable relative to one another.

16. A bore tube assembly according to claim 15 wherein said outer ring is fixed to said outer tube and said inner ring and said inner tube are slidable relative to one another, enabling axial thermal expansion of said inner tube relative to said outer tube.

17. A bore tube assembly according to claim 16 wherein said struts extend between said inner ring and said outer ring at angles offset from radii thereof enabling thermal expansion of said inner tube in a radial outward direction relative to said outer tube.

18. A bore tube assembly according to claim 15 wherein the struts have leading and trailing edges facing respective upstream and downstream directions of the cooling medium flow in said first passage, said trailing edges extending from one of said rings in radial and axial downstream directions.

19. In a turbine having a rotor rotatable about an axis, including a plurality of turbine wheels mounting turbine buckets, a bore tube assembly for conveying a cooling medium to the buckets of at least one of the said turbine wheels and conveying spent cooling medium to a return, comprising:

elongated tubes spaced from one another and extending generally parallel to said axis defining first and second passages for respectively conveying the cooling medium in one axial direction and conveying spent cooling medium in an axial direction opposite said one direction;

first and second sets of a plurality each of passageways carried by said rotor in communication with said first and second passages, respectively, for distributing the cooling medium to the buckets of said one turbine wheel and conveying the spent cooling medium through the bore tube assembly to the return.

* * * * *

UNITED STATES PATENT AND TRADEMARK OFFICE
CERTIFICATE OF CORRECTION

PATENT NO.     : 6,435,812 B1                                    Page 1 of 1
DATED          : August 20, 2002
INVENTOR(S)    : DeStefano et al.

It is certified that error appears in the above-identified patent and that said Letters Patent is hereby corrected as shown below:

<u>Column 10,</u>
Line 58, delete "end cap and"

Signed and Sealed this

Eleventh Day of February, 2003

JAMES E. ROGAN
*Director of the United States Patent and Trademark Office*